(12) United States Patent
Sasaki et al.

(10) Patent No.: US 8,749,919 B2
(45) Date of Patent: Jun. 10, 2014

(54) MAGNETIC HEAD FOR PERPENDICULAR MAGNETIC RECORDING WITH SHIELD AROUND MAIN POLE

(75) Inventors: Yoshitaka Sasaki, Santa Clara, CA (US); Hiroyuki Ito, Milpitas, CA (US); Kazuki Sato, Milpitas, CA (US); Atsushi Iijima, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 306 days.

(21) Appl. No.: 12/964,345

(22) Filed: Dec. 9, 2010

(65) Prior Publication Data

US 2012/0147499 A1 Jun. 14, 2012

(51) Int. Cl.
*G11B 5/127* (2006.01)
(52) U.S. Cl.
USPC ............. 360/125.13; 360/125.27; 360/125.17
(58) Field of Classification Search
USPC ............. 360/123.05, 125.27, 125.17, 125.13, 360/125.29, 125.3
See application file for complete search history.

(56) References Cited

U.S. PATENT DOCUMENTS

| | | | |
|---|---|---|---|
| 6,504,677 B1 * | 1/2003 | Han et al. | 360/125.56 |
| 6,724,572 B1 * | 4/2004 | Stoev et al. | 360/125.43 |
| 6,809,899 B1 | 10/2004 | Chen et al. | |
| 6,954,340 B2 | 10/2005 | Shukh et al. | |
| 7,009,812 B2 | 3/2006 | Hsu et al. | |
| 7,835,111 B2 | 11/2010 | Flint et al. | |
| 7,963,024 B2 | 6/2011 | Neuhaus | |
| 8,264,792 B2 | 9/2012 | Bai et al. | |
| 8,295,008 B1 | 10/2012 | Sasaki et al. | |
| 8,310,787 B1 | 11/2012 | Sasaki et al. | |
| 2002/0034043 A1 | 3/2002 | Okada et al. | |
| 2004/0150910 A1 | 8/2004 | Okada et al. | |
| 2005/0122619 A1 * | 6/2005 | Stageberg et al. | 360/125 |
| 2005/0128637 A1 | 6/2005 | Johnston et al. | |
| 2005/0141137 A1 | 6/2005 | Okada et al. | |
| 2006/0044682 A1 | 3/2006 | Le et al. | |
| 2006/0087765 A1 | 4/2006 | Iwakura et al. | |

(Continued)

FOREIGN PATENT DOCUMENTS

| | | |
|---|---|---|
| JP | A-2002-133610 | 5/2002 |
| JP | A-2002-298309 | 10/2002 |
| JP | A-2008-021398 | 1/2008 |
| JP | 2009064539 A * | 3/2009 |
| JP | A-2010-157303 | 7/2010 |

OTHER PUBLICATIONS

Nov. 28, 2012 Office Action in U.S. Appl. No. 12/964,202.

(Continued)

*Primary Examiner* — Julie Anne Watko
(74) *Attorney, Agent, or Firm* — Oliff PLC

(57) ABSTRACT

A magnetic head includes a shield, and first and second return path sections. The shield has an end face that is located in a medium facing surface to wrap around an end face of a main pole. The shield includes a bottom shield, two side shields, and a top shield. The first return path section is magnetically connected to the bottom shield and is greater than the bottom shield in length in a direction perpendicular to the medium facing surface. The second return path section magnetically couples the top shield and the main pole to each other. The coil includes a first portion that passes through a space defined by the main pole and the first return path section, and a second portion that passes through a space defined by the main pole and the second return path section.

7 Claims, 21 Drawing Sheets

(56) References Cited

U.S. PATENT DOCUMENTS

| | | |
|---|---|---|
| 2006/0103978 A1 | 5/2006 | Takano et al. |
| 2007/0146929 A1* | 6/2007 | Maruyama et al. ............ 360/125 |
| 2007/0177301 A1 | 8/2007 | Han et al. |
| 2008/0013209 A1 | 1/2008 | Sasaki et al. |
| 2008/0088972 A1 | 4/2008 | Sasaki et al. |
| 2009/0059426 A1 | 3/2009 | Sasaki et al. |
| 2009/0128953 A1 | 5/2009 | Jiang et al. |
| 2009/0296275 A1 | 12/2009 | Sasaki et al. |
| 2010/0165517 A1 | 7/2010 | Araki et al. |
| 2010/0277832 A1* | 11/2010 | Bai et al. .................. 360/125.03 |

OTHER PUBLICATIONS

Nov. 13, 2012 Office Action issued in Japanese Patent Application No. 2011-149242 (with translation).
Nov. 13, 2012 Office Action issued in Japanese Patent Application No. 2011-149243 (with translation).
Nov. 13, 2012 Office Action issued in Japanese Patent Application No. 2011-149244 (with translation).
U.S. Appl. No. 12/964,202, filed Dec. 9, 2010 in the name of Sasaki et al.
U.S. Appl. No. 12/964,313, filed Dec. 9, 2010 in the name of Sasaki et al.

* cited by examiner

MAGNETIC HEAD FOR PERPENDICULAR MAGNETIC RECORDING WITH SHIELD AROUND MAIN POLE

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a shield provided around a main pole.

2. Description of Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head having a magnetoresistive element (hereinafter, also referred to as MR element) for reading and a write head having an induction-type electromagnetic transducer for writing are stacked on a substrate. The write head includes a main pole that produces a magnetic field in a direction perpendicular to the plane of the recording medium. The main pole includes, for example, a track width defining portion having an end located in a medium facing surface that faces the recording medium, and a wide portion that is connected to the other end of the track width defining portion and is greater in width than the track width defining portion. The track width defining portion has a generally constant width. To achieve higher recording density, it is required that the write heads of the perpendicular magnetic recording system be smaller in track width and improved in write characteristics such as an overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of the recording medium by means of an airflow that comes from the air inflow end into the space between the medium facing surface and the recording medium. The magnetic head is typically disposed near the air outflow end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erase). To increase the recording density, it is required to prevent the occurrence of adjacent track erase.

A known technique for preventing adjacent track erase resulting from the skew is to configure the main pole so that its end face located in the medium facing surface decreases in width with increasing proximity to the top surface of the substrate, as disclosed in U.S. Patent Application Publication No. 2007/0177301 A1 and U.S. Pat. No. 6,954,340 B2, for example.

Another effective technique for preventing adjacent track erase resulting from the skew is to provide two side shields on opposite sides of the main pole in the track width direction, as disclosed in U.S. Patent Application Publication No. 2007/0177301 A1. It is also effective to provide a shield having an end face that is located in the medium facing surface and wraps around the end face of the main pole (such a shield will hereinafter be referred to as a wrap-around shield), as disclosed in U.S. Pat. No. 6,954,340 B2 and U.S. Patent Application Publication No. 2005/0128637 A1. The wrap-around shield includes a bottom shield that is located on the air-inflow-end side relative to the main pole, a top shield that is located on the air-outflow-end side relative to the main pole, and two side shields that are located on opposite sides of the main pole in the track width direction. These techniques allow capturing a magnetic flux that is produced from the end face of the main pole and expands in the track width direction. This makes it possible to prevent the occurrence of adjacent track erase.

FIG. 14 and FIG. 15 of U.S. Pat. No. 6,954,340 B2 show a magnetic head with a write gap disposed on a first return pole which also serves as the aforementioned bottom shield, and the main pole disposed on the write gap. A part of the coil is arranged to pass through the space defined by the first return pole and the main pole. Such a structure is disadvantageous in that it is difficult to bring the first return pole and the main pole into sufficiently close proximity to each other, and it is thus difficult for the first return pole to satisfactorily function as a shield.

In the magnetic head shown in FIG. 15 of U.S. Pat. No. 6,954,340 B2, the distance between two side parts of the main pole in the medium facing surface decreases with increasing proximity to the top surface of the substrate, whereas the distance between two sidewalls of the two side shields that are opposed to each other with the main pole therebetween is constant regardless of the distance from the top surface of the substrate. Consequently, in the medium facing surface of this magnetic head, the distance between a side part of the main pole and the opposing sidewall of the side shield increases with increasing proximity to the top surface of the substrate. In this structure, in the medium facing surface, the side part of the main pole and the sidewall of the side shield cannot be close to each other across the entire area where they are opposed to each other. Thus, this structure is disadvantageous in that it is difficult for the two side shields to satisfactorily capture a magnetic flux that is produced from the end face of the main pole and expands in the track width direction.

U.S. Patent Application Publication No. 2005/0128637 A1 shows in FIG. 8 a magnetic head including a bottom shorting shield connected to a first return pole and a top shorting shield connected to a second return pole. The lengths of the two shorting shields in the direction perpendicular to the medium facing surface are much smaller than the lengths of the two return poles in the direction perpendicular to the medium facing surface, and are constant regardless of the distance from the main pole. Accordingly, this magnetic head is disadvantageous in that it is difficult for the two shorting shields to direct much magnetic flux to the two return poles.

OBJECT AND SUMMARY OF THE INVENTION

It is an object of the present invention to provide a magnetic head for perpendicular magnetic recording that has a shield provided around a main pole and is configured to enhance the function of the shield.

A magnetic head for perpendicular magnetic recording of the present invention includes: a medium facing surface that faces a recording medium; a coil that produces a magnetic field corresponding to data to be written on the recording medium; and a main pole that has an end face located in the medium facing surface, allows a magnetic flux corresponding to the magnetic field produced by the coil to pass, and produces a write magnetic field for writing the data on the recording medium by means of a perpendicular magnetic recording system. The magnetic head further includes: a shield made of a magnetic material and having an end face that is located in the medium facing surface to wrap around the end face of the main pole; a gap part made of a nonmagnetic material and provided between the main pole and the shield; a first return path section and a second return path section each made of a magnetic material; and a substrate on which the coil, the main pole, the shield, the gap part, the first return path section, and the second return path section are stacked, the substrate having a top surface.

The shield includes a bottom shield, first and second side shields, and a top shield. The bottom shield has an end face that is located in the medium facing surface at a position backward of the end face of the main pole along a direction of travel of the recording medium. The first and second side shields have two end faces that are located in the medium facing surface at positions on opposite sides of the end face of the main pole in a track width direction. The top shield has an end face that is located in the medium facing surface at a position forward of the end face of the main pole along the direction of travel of the recording medium.

The first return path section includes a yoke layer, and a coupling layer that magnetically couples the bottom shield and the yoke layer to each other. In a cross section that intersects the end face of the main pole located in the medium facing surface and that is perpendicular to the medium facing surface and the top surface of the substrate, the yoke layer is greater than the bottom shield in length in a direction perpendicular to the medium facing surface, and the coupling layer is greater than the bottom shield and smaller than the yoke layer in length in the direction perpendicular to the medium facing surface. The second return path section magnetically couples the top shield and the main pole to each other. The coil includes a first portion that passes through a space defined by the main pole and the first return path section, and a second portion that passes through a space defined by the main pole and the second return path section.

In the magnetic head of the present invention, the first return path section may magnetically couple the bottom shield and the main pole to each other.

In the magnetic head of the present invention, the coupling layer may have an end face that is located in the medium facing surface at a position backward of the end face of the bottom shield along the direction of travel of the recording medium.

In the magnetic head of the present invention, the main pole may have a first side part and a second side part that are opposite to each other in the track width direction. The first side shield may have a first sidewall that is opposed to the first side part of the main pole. The second side shield may have a second sidewall that is opposed to the second side part of the main pole. In the medium facing surface, the distance between the first and second side parts in the track width direction and the distance between the first and second sidewalls in the track width direction may both decrease with increasing proximity to the top surface of the substrate.

In the medium facing surface, G1 may fall within the range of 20 to 80 nm while G2 may be greater than G1 and equal to or smaller than three times G1, where G1 represents both the distance between the first side part and the first sidewall and the distance between the second side part and the second sidewall, while G2 represents the distance between a bottom end of the main pole and the bottom shield.

In the magnetic head of the present invention, the main pole may have a bottom end which is an end closer to the top surface of the substrate, and a top surface opposite to the bottom end. The bottom end of the main pole may include an inclined portion that has an end located in the medium facing surface. The distance from the top surface of the substrate to any given point on the inclined portion decreases with increasing distance from the given point to the medium facing surface. The top surface of the main pole may include an inclined surface that has an end located in the medium facing surface. The distance from the top surface of the substrate to any given point on the inclined surface increases with increasing distance from the given point to the medium facing surface.

The bottom shield may have a top surface that is opposed to the inclined portion with the gap part interposed therebetween. The distance from the top surface of the substrate to any given point on the top surface of the bottom shield may decrease with increasing distance from the given point to the medium facing surface. The top shield may have a bottom surface that is opposed to the inclined surface with the gap part interposed therebetween. The distance from the top surface of the substrate to any given point on the bottom surface of the top shield may increase with increasing distance from the given point to the medium facing surface.

The magnetic head for perpendicular magnetic recording of the present invention includes the shield having an end face that is located in the medium facing surface to wrap around the end face of the main pole. The shield includes the bottom shield, the first and second side shields, and the top shield. The magnetic head of the present invention further includes the first return path section magnetically connected to the bottom shield, and the second return path section that magnetically couples the top shield and the main pole to each other. The first return path section includes the yoke layer, and the coupling layer that couples the bottom shield and the yoke layer to each other. In a cross section that intersects the end face of the main pole located in the medium facing surface and that is perpendicular to the medium facing surface and the top surface of the substrate, the yoke layer is greater than the bottom shield in length in the direction perpendicular to the medium facing surface, and the coupling layer is greater than the bottom shield and smaller than the yoke layer in length in the direction perpendicular to the medium facing surface. Consequently, according to the present invention, it is possible for the shield to capture much magnetic flux, and it is also possible to bring the bottom shield and the main pole into sufficiently close proximity to each other. As a result, it becomes possible to enhance the function of the shield.

According to the present invention, in the medium facing surface, the distance between the first and second side parts of the main pole and the distance between the first and second sidewalls of the two side shields may both decrease with increasing proximity to the top surface of the substrate. With such a configuration, according to the present invention, it becomes possible to enhance the function of the two side shields.

Other objects, features and advantages of the present invention will become fully apparent from the following description.

DETAILED DESCRIPTION OF THE PREFERRED EMBODIMENTS

First Embodiment

Figure 1:
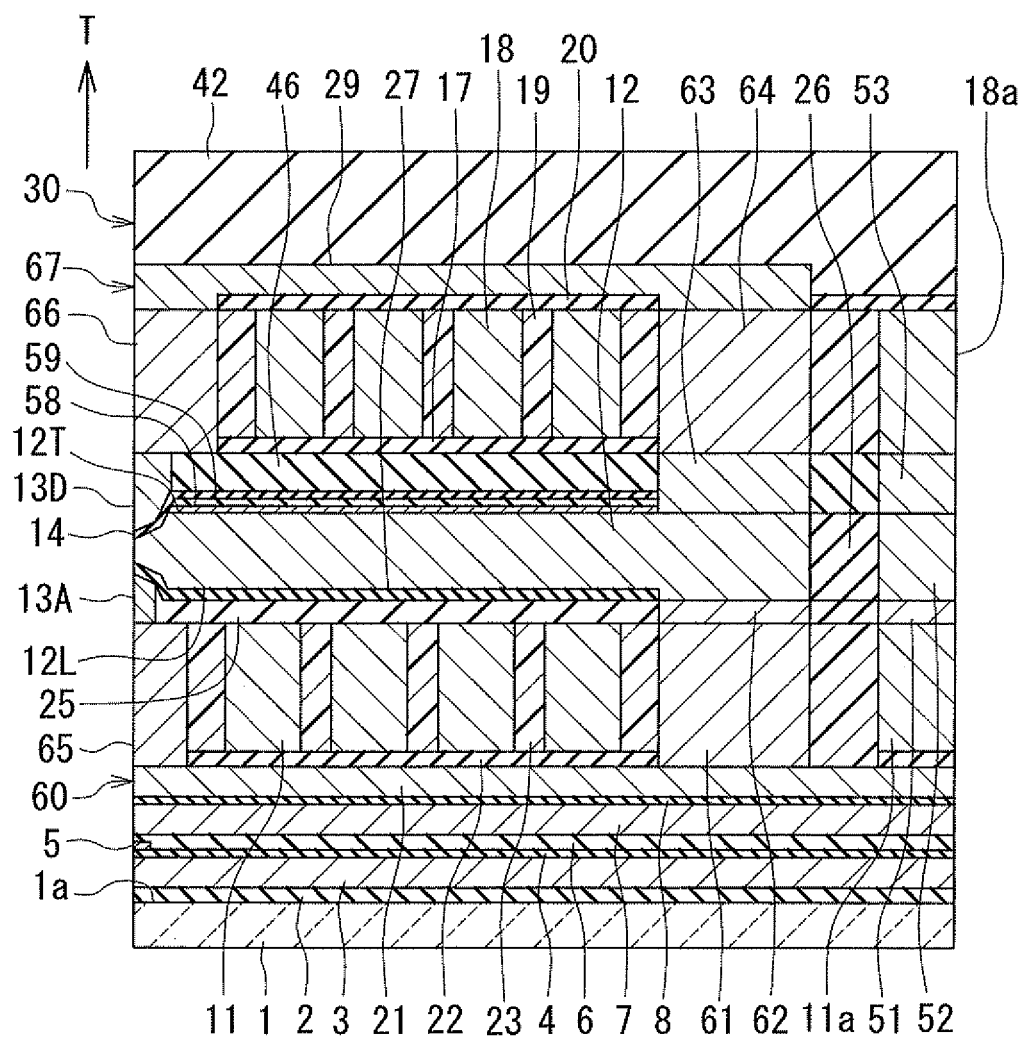
FIG. 1 is a cross-sectional view of a magnetic head according to a first embodiment of the invention.
Figure 2A:
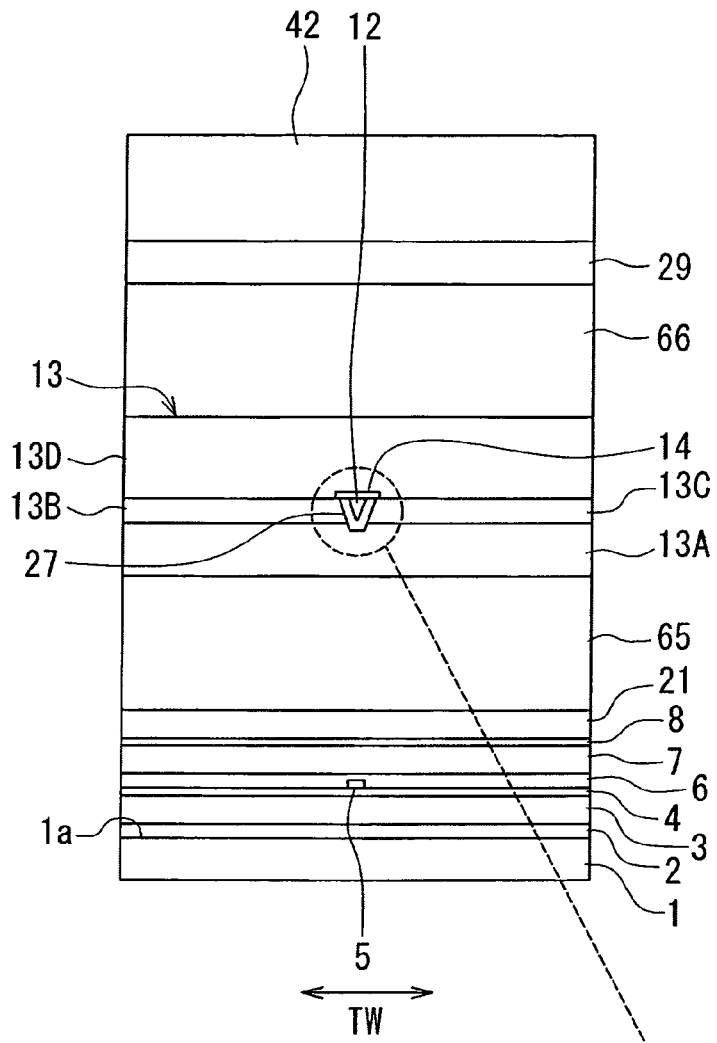
FIG. 2A is a front view showing the medium facing surface of the magnetic head according to the first embodiment of the invention.
Figure 2B:
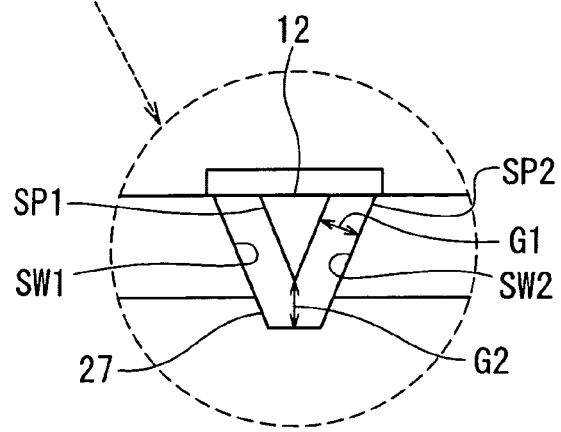
FIG. 2B is an enlarged explanatory diagram showing part of FIG. 2A.
Figure 3:
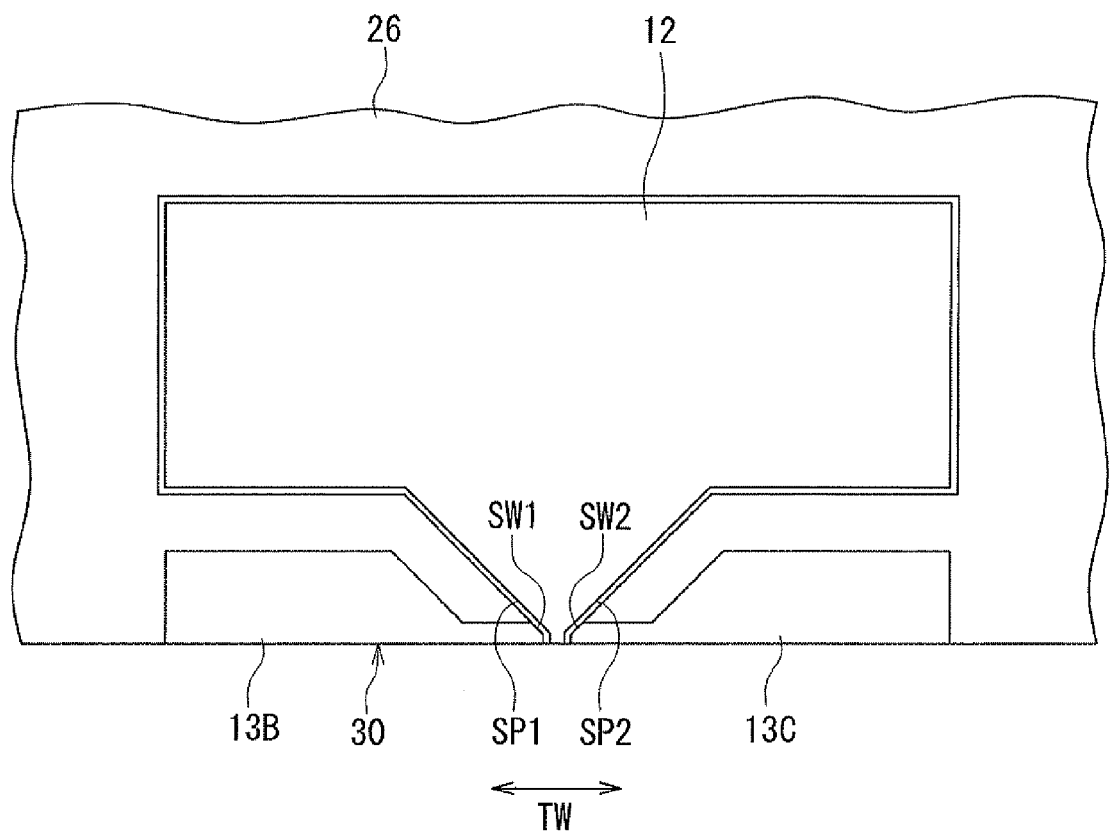
FIG. 3 is a plan view showing a main pole and two side shields of the magnetic head according to the first embodiment of the invention.
Figure 4:
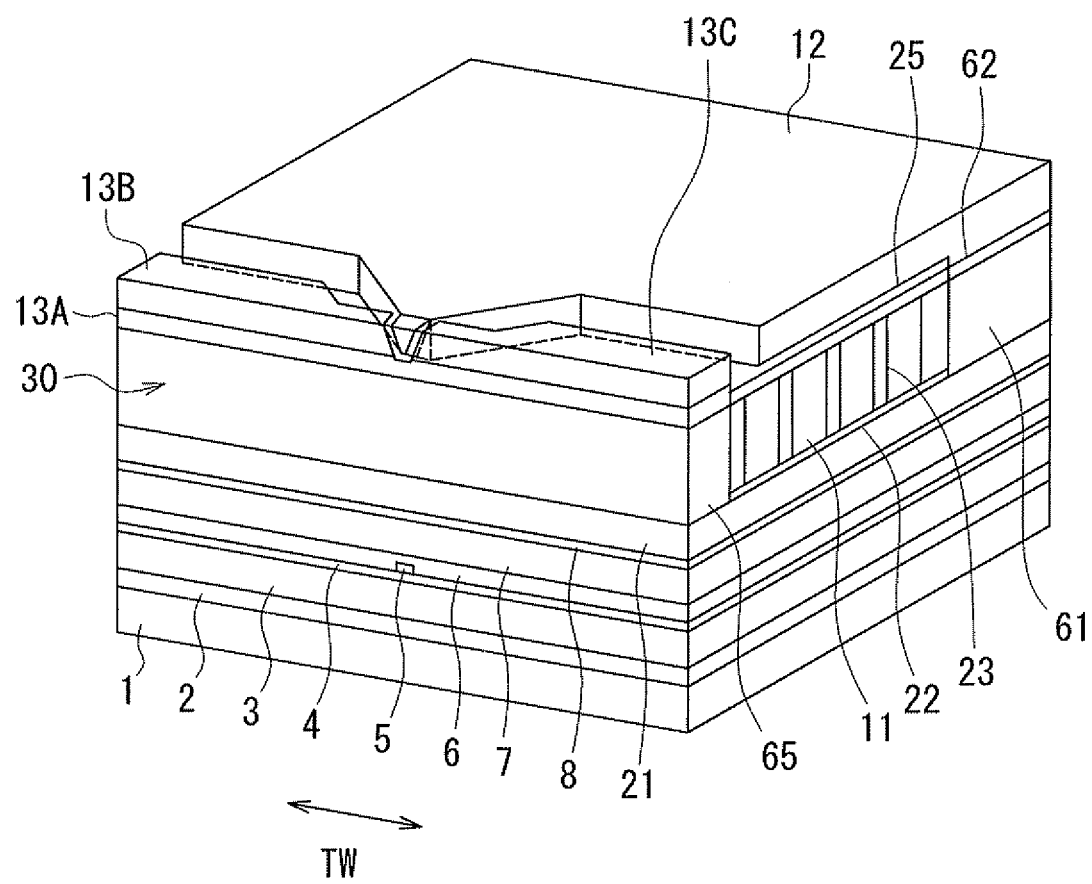
FIG. 4 is a perspective view of a part of the magnetic head according to the first embodiment of the invention.
Figure 5:
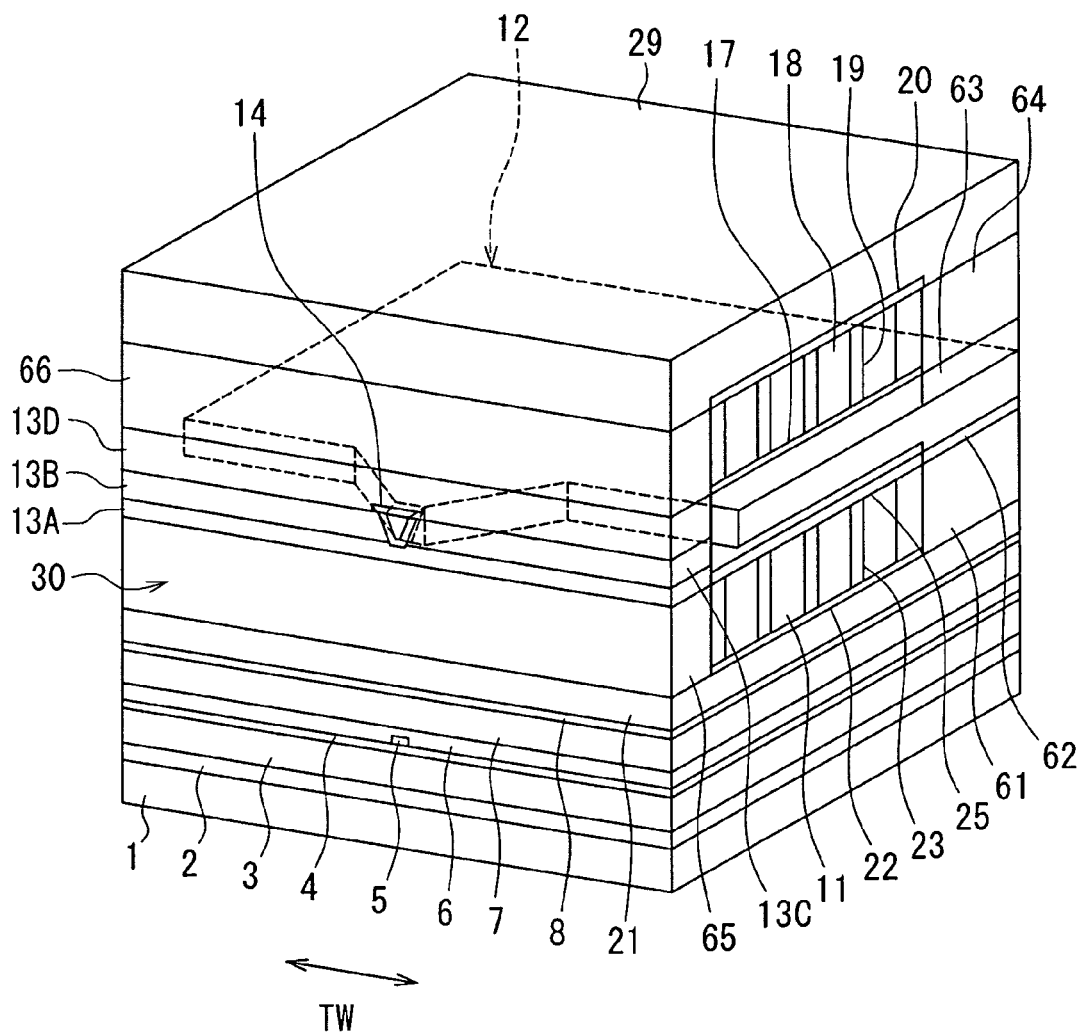
FIG. 5 is a perspective view of the magnetic head according to the first embodiment of the invention.

Embodiments of the present invention will now be described in detail with reference to the drawings. First, reference is made to FIG. 1 to FIG. 5 to describe the configuration of a magnetic head according to a first embodiment of the invention. FIG. 1 is a cross-sectional view of the magnetic head according to the present embodiment. Note that FIG. 1 shows a cross section perpendicular to the medium facing surface and the top surface of the substrate. The arrow with the symbol T in FIG. 1 indicates the direction of travel of the recording medium. FIG. 2A is a front view showing the medium facing surface of the magnetic head according to the present embodiment. FIG. 2B is an enlarged explanatory diagram showing part of FIG. 2A. FIG. 3 is a plan view showing a main pole and two side shields of the magnetic head according to the present embodiment. FIG. 4 is a perspective view of a part of the magnetic head according to the present embodiment. FIG. 5 is a perspective view of the magnetic head according to the present embodiment. The arrows with the symbol TW in FIG. 2A and FIG. 3 to FIG. 5 indicate the track width direction.

As shown in FIG. 1 and FIG. 2A, the magnetic head for perpendicular magnetic recording (hereinafter simply referred to as magnetic head) according to the present embodiment includes: a substrate 1 made of a ceramic material such as aluminum oxide-titanium carbide ($Al_2O_3$-TiC) and having a top surface 1a; an insulating layer 2 made of an insulating material such as alumina ($Al_2O_3$) and disposed on the top surface 1a of the substrate 1; a bottom read shield layer 3 made of a magnetic material and disposed on the insulating layer 2; a bottom read shield gap film 4 which is an insulating film disposed on the bottom read shield layer 3; a magnetoresistive (MR) element 5 as a read element disposed on the bottom read shield gap film 4; a top read shield gap film 6 which is an insulating film disposed on the MR element 5; and a top read shield layer 7 made of a magnetic material and disposed on the top read shield gap film 6.

An end of the MR element 5 is located in a medium facing surface 30 that faces the recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of a current-in-plane (CIP) type wherein a current to be used for detecting magnetic signals is fed in a direction generally parallel to the planes of layers constituting the GMR element, or may be of a current-perpendicular-to-plane (CPP) type wherein a current to be used for detecting magnetic signals is fed in a direction generally perpendicular to the planes of the layers constituting the GMR element.

The parts from the bottom read shield layer 3 to the top read shield layer 7 constitute a read head. The magnetic head further includes a nonmagnetic layer 8 made of a nonmagnetic material and disposed on the top read shield layer 7, and a write head disposed on the nonmagnetic layer 8. The nonmagnetic layer 8 is made of alumina, for example. The write head includes a coil, a main pole 12, a shield 13, and a gap part.

The coil includes a first portion 11 and a second portion 18. Each of the first portion 11 and the second portion 18 is planar spiral-shaped. The first portion 11 and the second portion 18 are connected in series or in parallel. In FIG. 1, the reference symbol 11a indicates a connection part of the first portion 11 connected to the second portion 18, and the reference symbol 18a indicates a connection part of the second portion 18 connected to the first portion 11. The magnetic head further includes connection layers 51, 52, and 53 that are each made of a conductive material and are stacked in this order on the connection part 11a. The connection part 18a is disposed on the connection layer 53.

The coil including the first and second portions 11 and 18 produces a magnetic field corresponding to data to be written on the recording medium. The main pole 12 has an end face located in the medium facing surface 30. The main pole 12 allows a magnetic flux corresponding to the magnetic field produced by the coil to pass, and produces a write magnetic field for writing data on the recording medium by means of the perpendicular magnetic recording system. FIG. 1 shows a cross section that intersects the end face of the main pole 12 located in the medium facing surface 30 and that is perpendicular to the medium facing surface 30 and the top surface 1a of the substrate 1 (the cross section will hereinafter be referred to as main cross section).

The shield 13 has an end face that is located in the medium facing surface 30 to wrap around the end face of the main pole 12. The shield 13 is made of a magnetic material. Examples of materials that can be used for the shield 13 include CoFeN, CoNiFe, NiFe, and CoFe.

The magnetic head further includes: a first return yoke layer 21 disposed backward of the main pole 12 and the shield 13 along the direction T of travel of the recording medium; and a second return yoke layer 29 disposed forward of the main pole 12 and the shield 13 along the direction T of travel of the recording medium. The first and second return yoke layers 21 and 29 are each made of a magnetic material. Examples of materials that can be used for these layers include CoFeN, CoNiFe, NiFe, and CoFe. The first return yoke layer 21 corresponds to the yoke layer of the present invention.

The magnetic head further includes: coupling layers 61 and 62 that magnetically couple the main pole 12 and the first return yoke layer 21 to each other; coupling layers 63 and 64 that magnetically couple the main pole 12 and the second return yoke layer 29 to each other; a coupling layer 65 that magnetically couples the shield 13 and the first return yoke layer 21 to each other; and a coupling layer 66 that magnetically couples the shield 13 and the second return yoke layer 29 to each other. The coupling layers 61 to 66 are each made of a magnetic material. Examples of materials that can be used for these coupling layers include CoFeN, CoNiFe, NiFe, and CoFe.

The first return yoke layer 21 is disposed on the nonmagnetic layer 8. The coupling layer 65 is disposed on the first return yoke layer 21. The first return yoke layer 21 and the coupling layer 65 have their respective end faces that are located in the medium facing surface 30 at positions backward of the end face of the main pole 12 and the end face of the shield 13 along the direction T of travel of the recording medium. The magnetic head further includes a not-shown insulating layer made of an insulating material and disposed around the first return yoke layer 21 on the nonmagnetic layer 8, and an insulating layer 22 made of an insulating material and disposed on a part of the top surface of the first return yoke layer 21. The insulating layer disposed around the first return yoke layer 21 and the insulating layer 22 are each made of alumina, for example. The first portion 11 is disposed on the insulating layer 22.

The coupling layer 61 is disposed on a part of the first return yoke layer 21 away from the medium facing surface 30. The first portion 11 is wound around the coupling layer 61.

The magnetic head further includes: an insulating layer 23 made of an insulating material and disposed around the first portion 11 and the coupling layer 61 and in the space between every adjacent turns of the first portion 11; and a not-shown insulating layer disposed around the insulating layer 23 and the coupling layer 65. The top surfaces of the first portion 11, the coupling layers 61 and 65, the insulating layer 23 and the not-shown insulating layer are even with each other. The insulating layer 23 is made of a photoresist, for example. The not-shown insulating layer is made of alumina, for example. The first portion 11 is made of a conductive material such as copper. The coupling layer 62 is disposed on the coupling layer 61. The connection layer 51 is disposed on the connection part 11a of the first portion 11.

The magnetic head further includes an insulating layer 25 made of an insulating material and disposed around the connection layer 51 and the coupling layer 62 on the top surfaces of the first portion 11 and the insulating layer 23. The insulating layer 25 is made of alumina, for example.

The shield 13 includes a bottom shield 13A, a first side shield 13B, a second side shield 13C, and a top shield 13D that are magnetically coupled to each other. The first and second side shields 13B and 13C are disposed on opposite sides of the main pole 12 in the track width direction TW. The bottom shield 13A is located backward of the first and second side shields 13B and 13C along the direction T of travel of the recording medium. The top shield 13D is located forward of the first and second side shields 13B and 13C along the direction T of travel of the recording medium.

The bottom shield 13A has an end face that is located in the medium facing surface 30 at a position backward of the end face of the main pole 12 along the direction T of travel of the recording medium. The first and second side shields 13B and 13C have two end faces that are located in the medium facing surface 30 at positions on opposite sides of the end face of the main pole 12 in the track width direction TW. The top shield 13D has an end face that is located in the medium facing surface 30 at a position forward of the end face of the main pole 12 along the direction T of travel of the recording medium. The end faces of the bottom shield 13A, the first side shield 13B, the second side shield 13C and the top shield 13D are arranged to wrap around the end face of the main pole 12.

As shown in FIG. 1 and FIG. 2B, the main pole 12 has: a bottom end 12L which is an end closer to the top surface 1a of the substrate 1; a top surface 12T opposite to the bottom end 12L; and first and second side parts SP1 and SP2 that are opposite to each other in the track width direction TW. The first side shield 13B has a first sidewall SW1 that is opposed to the first side part SP1 of the main pole 12. The second side shield 13C has a second sidewall SW2 that is opposed to the second side part SP2 of the main pole 12.

The gap part is made of a nonmagnetic material and disposed between the main pole 12 and the shield 13. The gap part includes a first gap layer 27 disposed between the main pole 12 and the bottom shield 13A and between the main pole 12 and the side shields 13B and 13C, and a second gap layer 14 disposed between the main pole 12 and the top shield 13D.

The bottom shield 13A is disposed on the coupling layer 65. The first and second side shields 13B and 13C are disposed on the bottom shield 13A and are in contact with the top surface of the bottom shield 13A. The first gap layer 27 is arranged to extend along the sidewalls of the first and second side shields 13B and 13C, the top surface of the bottom shield 13A, and the top surface of the insulating layer 25. The first gap layer 27 is made of a nonmagnetic material. The nonmagnetic material used to form the first gap layer 27 may be an insulating material or a nonmagnetic metal material. Alumina is an example of insulating materials that can be used to form the first gap layer 27. Ru is an example of nonmagnetic metal materials that can be used to form the first gap layer 27.

Although not shown, the magnetic head further includes a seed layer arranged to extend along the surface of the first gap layer 27. The seed layer is made of a metal material. The metal material used to form the seed layer may be a nonmagnetic metal material or a magnetic metal material. Ru is an example of nonmagnetic metal materials that can be used to form the seed layer. NiFe, CoNiFe, and CoFe are examples of magnetic metal materials that can be used to form the seed layer. The seed layer is used as an electrode and a seed when forming the main pole 12 by plating. The seed layer has a thickness in the range of 40 to 60 nm, for example. The first gap layer 27 and the seed layer have openings for exposing the top surface of the connection layer 51 and openings for exposing the top surface of the coupling layer 62. The connection layer 52 is disposed on the connection layer 51.

The main pole 12 is disposed over the bottom shield 13A and the insulating layer 25 such that the first gap layer 27 is interposed between the main pole 12 and the top surfaces of the bottom shield 13A and the insulating layer 25. As shown in FIG. 2A, the first gap layer 27 is interposed also between the main pole 12 and each of the first and second side shields 13B and 13C.

The bottom end 12L of the main pole 12 is in contact with the top surface of the coupling layer 62 at a position away from the medium facing surface 30. The main pole 12 is made of a magnetic metal material. Examples of materials that can be used for the main pole 12 include NiFe, CoNiFe, and CoFe. The shape of the main pole 12 will be described in detail later.

The magnetic head further includes a nonmagnetic layer 26 made of a nonmagnetic material and disposed around the main pole 12, the bottom shield 13A, the side shields 13B and 13C, and the connection layer 52. In the present embodiment, the nonmagnetic layer 26 is made of a nonmagnetic insulating material such as alumina, in particular.

The magnetic head further includes: a nonmagnetic metal layer 58 made of a nonmagnetic metal material and disposed on a part of the top surface 12T of the main pole 12 at a position away from the medium facing surface; and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The second gap layer 14 is disposed to cover the main pole 12, the nonmagnetic metal layer 58, and the insulating layer 59. The second gap layer 14 is made of a nonmagnetic material. Examples of materials that can be used for the second gap layer 14 include nonmagnetic insulating materials such as alumina, and nonmagnetic conductive materials such as Ru, NiCu, Ta, W, NiB, and NiP.

The top shield 13D is disposed over the side shields 13B and 13C and the second gap layer 14, and is in contact with the top surfaces of the side shields 13B and 13C and the second gap layer 14. In the medium facing surface 30, a part of the end face of the top shield 13D is located at a predetermined distance from the end face of the main pole 12, the distance being created by the thickness of the second gap layer 14. The thickness of the second gap layer 14 preferably falls within the range of 5 to 60 nm, and may be 30 to 60 nm, for example. The end face of the main pole 12 has a side that is adjacent to the second gap layer 14, and the side defines the track width.

The coupling layer 63 is disposed on a part of the main pole 12 away from the medium facing surface 30. The connection layer 53 is disposed on the connection layer 52. The magnetic head further includes a nonmagnetic layer 46 disposed around the top shield 13D, the coupling layer 63 and the connection layer 53. The nonmagnetic layer 46 is made of an inorganic insulating material, for example. The inorganic insulating material may be alumina or silicon oxide, for example. The top surfaces of the top shield 13D, the coupling layer 63, the connection layer 53 and the nonmagnetic layer 46 are even with each other.

The coupling layer 66 is disposed on the top shield 13D. The coupling layer 66 has an end face located in the medium facing surface 30. The coupling layer 64 is disposed on the coupling layer 63. The connection part 18a of the second portion 18 is disposed on the connection layer 53.

The magnetic head further includes an insulating layer 17 made of an insulating material and disposed on a part of the top surface of the nonmagnetic layer 46. The insulating layer 17 is made of alumina, for example. The second portion 18 is disposed on the insulating layer 17. The second portion 18 is wound around the coupling layer 64.

The magnetic head further includes: an insulating layer 19 made of an insulating material and disposed around the second portion 18 and the coupling layer 64 and in the space between every adjacent turns of the second portion 18; and a not-shown insulating layer disposed around the insulating layer 19 and the coupling layer 66. The top surfaces of the second portion 18, the coupling layers 64 and 66, the insulating layer 19 and the not-shown insulating layer are even with each other. The magnetic head further includes an insulating layer 20 disposed to cover the second portion 18 and the insulating layer 19. The insulating layer 19 is made of a photoresist, for example. The not-shown insulating layer and the insulating layer 20 are made of alumina, for example. The second portion 18 is made of a conductive material such as copper.

The second return yoke layer 29 is disposed to couple the coupling layer 66 to the coupling layer 64. The second return yoke layer 29 has an end face located in the medium facing surface 30.

The magnetic head further includes a protection layer 42 made of a nonmagnetic material and disposed to cover the second return yoke layer 29. The protection layer 42 is made of, for example, an inorganic insulating material such as alumina.

As has been described, the magnetic head according to the present embodiment includes the medium facing surface 30, the read head, and the write head. The medium facing surface 30 faces the recording medium. The read head and the write head are stacked on the substrate 1. The read head is disposed backward along the direction T of travel of the recording medium (in other words, disposed closer to the air inflow end of the slider), while the write head is disposed forward along the direction T of travel of the recording medium (in other words, disposed closer to the air outflow end of the slider).

The read head includes: the MR element 5 as the read element; the bottom read shield layer 3 and the top read shield layer 7 for shielding the MR element 5, with their respective portions near the medium facing surface 30 opposed to each other with the MR element 5 therebetween; the bottom read shield gap film 4 disposed between the MR element 5 and the bottom read shield layer 3; and the top read shield gap film 6 disposed between the MR element 5 and the top read shield layer 7.

The write head includes: the coil including the first and second portions 11 and 18; the main pole 12; the shield 13; the gap part; the first and second return yoke layers 21 and 29; and the coupling layers 61 to 66.

The coupling layer 65, the first return yoke layer 21, and the coupling layers 61 and 62 constitute a first return path section 60. In the present embodiment, in particular, the first return path section 60 magnetically couples the bottom shield 13A and the main pole 12 to each other. The coupling layer 66, the second return yoke layer 29, and the coupling layers 63 and 64 constitute a second return path section 67 that magnetically couples the top shield 13D and the main pole 12 to each other. Each of the first and second return path sections 60 and 67 is made of a magnetic material. The first portion 11 of the coil passes through the space defined by the main pole 12 and the first return path section 60. The second portion 18 of the coil passes through the space defined by the main pole 12 and the second return path section 67.

The shield 13 includes: the first and second side shields 13B and 13C disposed on opposite sides of the main pole 12 in the track width direction TW; the bottom shield 13A disposed backward of the first and second side shields 13B and 13C along the direction T of travel of the recording medium; and the top shield 13D disposed forward of the first and second side shields 13B and 13C along the direction T of travel of the recording medium. The first and second side shields 13B and 13C are located at positions that are near the medium facing surface 30 and symmetric with respect to the center of the main pole 12 in the track width direction TW.

The bottom shield 13A has an end face that is located in the medium facing surface 30 at a position backward of the end face of the main pole 12 along the direction T of travel of the recording medium. The first and second side shields 13B and 13C have two end faces that are located in the medium facing surface 30 at positions on opposite sides of the end face of the main pole 12 in the track width direction TW. The top shield 13D has an end face that is located in the medium facing surface 30 at a position forward of the end face of the main pole 12 along the direction T of travel of the recording medium.

The first return path section 60 includes the first return yoke layer 21, and the coupling layer 65 that magnetically couples the bottom shield 13A and the first return yoke layer 21 to each other. As shown in FIG. 1, in the main cross section, the first return yoke layer 21 is greater than the bottom shield 13A in length in the direction perpendicular to the medium facing surface 30. In the main cross section, the coupling layer 65 is greater than the bottom shield 13A and smaller than the first return yoke layer 21 in length in the direction perpendicular to the medium facing surface 30. In the present embodiment, in the main cross section, the first return path section 60 is equal to the first return yoke layer 21 in length in the direction perpendicular to the medium facing surface 30. In the main cross section, the length of the bottom shield 13A in the direction perpendicular to the medium facing surface 30 falls within the range of 0.1 to 0.25 µm, for example. In the main cross section, the length of the coupling layer 65 in the direction perpendicular to the medium facing surface 30 falls within the range of 0.3 to 0.8 µm, for example.

The bottom shield 13A has a middle portion and two side portions. The middle portion includes a part that is opposed to the main pole 12 with the first gap layer 27 interposed therebetween. The two side portions are located on opposite sides of the middle portion in the track width direction. The middle portion is constant in length in the direction perpendicular to the medium facing surface 30 regardless of position along the track width direction. Consequently, in the main cross section, the bottom shield 13A is equal to the middle portion in length in the direction perpendicular to the medium facing surface 30. The maximum length of the side portions in the direction perpendicular to the medium facing surface 30 is greater than the length of the middle portion in the direction perpendicular to the medium facing surface 30. Like the bottom shield 13A, the top shield 13D also has a middle portion and two side portions.

The gap part includes the first gap layer 27 disposed between the main pole 12 and the bottom shield 13A and between the main pole 12 and the side shields 13B and 13C, and the second gap layer 14 disposed between the main pole 12 and the top shield 13D.

Figure 6:
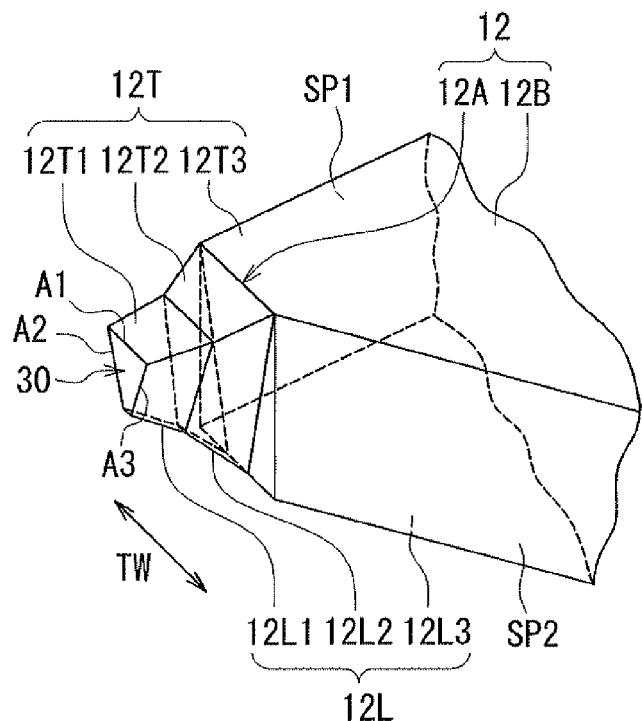
FIG. 6 is a perspective view of a part of the main pole in the vicinity of the medium facing surface of the magnetic head according to the first embodiment of the invention.
Figure 7:
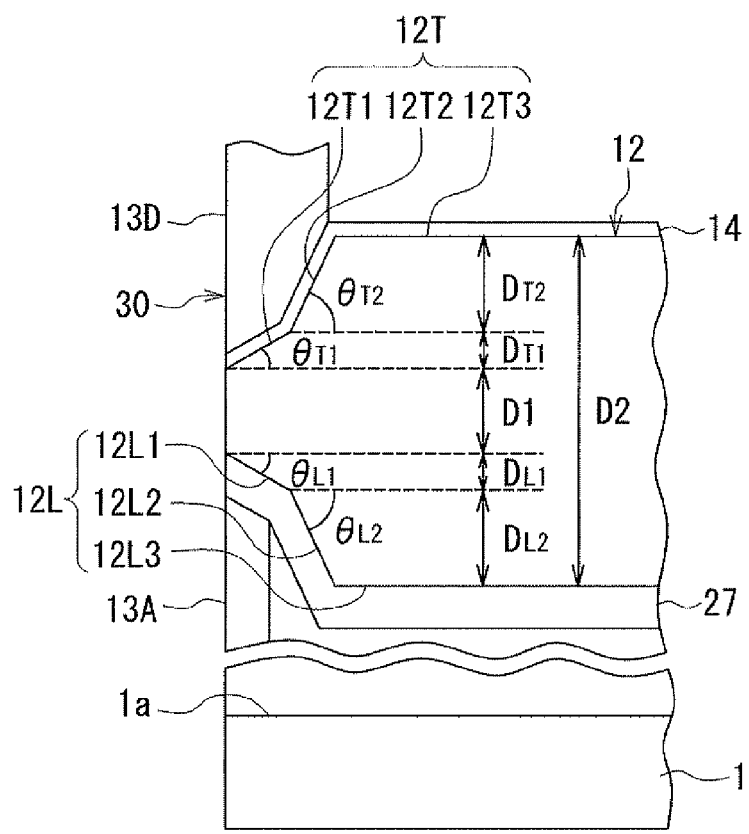
FIG. 7 is a cross-sectional view of a part of the main pole in the vicinity of the medium facing surface of the magnetic head according to the first embodiment of the invention.

The shape of the main pole 12 will now be described in detail with reference to FIG. 6 and FIG. 7. FIG. 6 is a perspective view of a part of the main pole 12 in the vicinity of the medium facing surface 30. FIG. 7 is a cross-sectional view of a part of the main pole 12 in the vicinity of the medium facing surface 30. As shown in FIG. 6, the main pole 12 includes a track width defining portion 12A and a wide portion 12B. The track width defining portion 12A has an end face located in the medium facing surface 30, and an end opposite to the end face. The wide portion 12B is connected to the end of the track width defining portion 12A. As shown in FIG. 6 and FIG. 7, the main pole 12 has: the bottom end 12L which is the end closer to the top surface 1a of the substrate 1; the top surface 12T opposite to the bottom end 12L; the first side part SP1; and the second side part SP2. The width of the top surface 12T in the track width direction TW is greater in the wide portion 12B than in the track width defining portion 12A.

In the track width defining portion 12A, the width of the top surface 12T in the track width direction TW is generally constant regardless of the distance from the medium facing surface 30. In the wide portion 12B, the width of the top surface 12T in the track width direction TW is, for example, equal to that in the track width defining portion 12A when seen at the boundary between the track width defining portion 12A and the wide portion 12B, and gradually increases with increasing distance from the medium facing surface 30, then becoming constant. Here, the length of the track width defining portion 12A in the direction perpendicular to the medium facing surface 30 will be referred to as neck height. The neck height falls within the range of 0 to 0.3 µm, for example. A zero neck height means that no track width defining portion 12A exists and an end face of the wide portion 12B is thus located in the medium facing surface 30.

The bottom end 12L includes a first portion 12L1, a second portion 12L2, and a third portion 12L3 that are contiguously arranged in order of increasing distance from the medium facing surface 30. The first portion 12L1 has an end located in the medium facing surface 30. Each of the first and second portions 12L1 and 12L2 may be an edge formed by two intersecting planes, or may be a plane connecting two planes to each other. The third portion 12L3 is a plane extending in a direction substantially perpendicular to the medium facing surface 30. The top surface 12T includes a fourth portion 12T1, a fifth portion 12T2, and a sixth portion 12T3 that are contiguously arranged in order of increasing distance from the medium facing surface 30. The fourth portion 12T1 has an end located in the medium facing surface 30.

As shown in FIG. 7, the distance from the top surface 1a of the substrate 1 to any given point on each of the first and second portions 12L1 and 12L2 decreases with increasing distance from the given point to the medium facing surface

30. The first portion 12L1 has an angle of inclination $\theta_{L1}$ with respect to the direction perpendicular to the medium facing surface 30, and the second portion 12L2 has an angle of inclination $\theta_{L2}$ with respect to the direction perpendicular to the medium facing surface 30, $\theta_{L2}$ being greater than $\theta_{L1}$. The third portion 12L3 extends in a direction substantially perpendicular to the medium facing surface 30. The first portion 12L1 corresponds to the inclined portion in the present invention. The bottom shield 13A has a top surface that is opposed to the first portion 12L1 with the gap part (the first gap layer 27) interposed therebetween. The distance from the top surface 1*a* of the substrate 1 to any given point on the top surface of the bottom shield 13A decreases with increasing distance from the given point to the medium facing surface 30.

The distance from the top surface 1*a* of the substrate 1 to any given point on each of the fourth and fifth portions 12T1 and 12T2 increases with increasing distance from the given point to the medium facing surface 30. The fourth portion 12T1 has an angle of inclination $\theta_{T1}$ with respect to the direction perpendicular to the medium facing surface 30, and the fifth portion 12T2 has an angle of inclination $\theta_{T2}$ with respect to the direction perpendicular to the medium facing surface 30, $\theta_{T2}$ being greater than $\theta_{T1}$. The sixth portion 12T3 extends in the direction substantially perpendicular to the medium facing surface 30. The fourth and fifth portions 12T1 and 12T2 correspond to the inclined surface in the present invention. The top shield 13D has a bottom surface that is opposed to the fourth and fifth portions 12T1 and 12T2 with the gap part (the second gap layer 14) interposed therebetween. The distance from the top surface 1*a* of the substrate 1 to any given point on the bottom surface of the top shield 13D increases with increasing distance from the given point to the medium facing surface 30.

Both the angle of inclination $\theta_{L1}$ of the first portion 12L1 and the angle of inclination $\theta_{T1}$ of the fourth portion 12T1 preferably fall within the range of 15° to 45°. Both the angle of inclination $\theta_{L2}$ of the second portion 12L2 and the angle of inclination $\theta_{T2}$ of the fifth portion 12T2 preferably fall within the range of 45° to 85°.

As shown in FIG. 6, the end face of the main pole 12 located in the medium facing surface 30 has a first side A1 adjacent to the second gap layer 14, a second side A2 connected to a first end of the first side A1, and a third side A3 connected to a second end of the first side A1. The first side A1 defines the track width. The position of an end of the recording bits to be recorded on the recording medium depends on the position of the first side A1. The end face of the main pole 12 located in the medium facing surface 30 decreases in width in the track width direction TW with increasing proximity to the bottom end 12L of the main pole 12, that is, with increasing proximity to the top surface 1*a* of the substrate 1. Each of the second side A2 and the third side A3 forms an angle in the range of, for example, 7° to 17°, or preferably in the range of 10° to 15°, with respect to the direction perpendicular to the top surface of the substrate 1. The first side A1 has a length in the range of 0.05 to 0.20 μm, for example.

Here, as shown in FIG. 7, let D1 be the thickness (length in the direction perpendicular to the top surface 1*a* of the substrate 1) of the main pole 12 at the medium facing surface 30, and D2 be the distance between the third portion 12L3 and the sixth portion 12T3. Let also $D_{L1}$ be the length in the direction perpendicular to the top surface 1*a* of the substrate 1 between two ends of the first portion 12L1 that are opposite to each other in that direction. Let also $D_{L2}$ be the length in the direction perpendicular to the top surface 1*a* of the substrate 1 between two ends of the second portion 12L2 that are opposite to each other in that direction. Let $D_{T1}$ be the length in the direction perpendicular to the top surface 1*a* of the substrate 1 between two ends of the fourth portion 12T1 that are opposite to each other in that direction. Let also $D_{T2}$ be the length in the direction perpendicular to the top surface 1*a* of the substrate 1 between two ends of the fifth portion 12T2 that are opposite to each other in that direction. For example, D1 falls within the range of 0.05 to 0.2 μm, while D2 falls within the range of 0.4 to 0.8 μm. For instance, $D_{L1}$ is greater than 0 and equal to or smaller than 0.3 μm, while $D_{L2}$ falls within the range of 0.15 to 0.3 μm. Furthermore, by way of example, $D_{T1}$ is greater than 0 and equal to or smaller than 0.3 μm, while $D_{T2}$ falls within the range of 0.15 to 0.3 μm.

FIG. 6 shows an example where the distance from the medium facing surface 30 to the boundary between the second portion 12L2 and the third portion 12L3, and the distance from the medium facing surface 30 to the boundary between the fifth portion 12T2 and the sixth portion 12T3, are both equal to the neck height, i.e., the distance from the medium facing surface 30 to the boundary between the track width defining portion 12A and the wide portion 12B. Nevertheless, the distance from the medium facing surface 30 to the boundary between the second portion 12L2 and the third portion 12L3, and the distance from the medium facing surface 30 to the boundary between the fifth portion 12T2 and the sixth portion 12T3, may each be smaller or greater than the neck height.

As shown in FIG. 2B, in the medium facing surface 30, the distance between the first and second side parts SP1 and SP2 of the main pole 12 in the track width direction TW decreases with increasing proximity to the top surface 1*a* of the substrate 1. Likewise, in the medium facing surface 30, the distance between the first and second sidewalls SW1 and SW2 of the side shields 13B and 13C in the track width direction TW decreases with increasing proximity to the top surface 1*a* of the substrate 1. In the medium facing surface 30, the first side part SP1 and the first sidewall SW1 are substantially parallel to each other, and the second side part SP2 and the second sidewall SW2 are also substantially parallel to each other. In the medium facing surface 30, the distance between the first side part SP1 and the first sidewall SW1 and the distance between the second side part SP2 and the second sidewall SW2 are equal. Here, the distances will be denoted as G1. G1 falls within the range of 20 to 80 nm, for example. Here, let G2 be the distance between the bottom end 12L of the main pole 12 and the bottom shield 13A in the medium facing surface 30. G2 is greater than G1 and equal to or smaller than three times G1. This relationship is achieved by forming the first gap layer 27 and the main pole 12 after the formation of the side shields 13B and 13C having the sidewalls SW1 and SW2.

A description will now be given of a method of manufacturing the magnetic head according to the present embodiment. In the method of manufacturing the magnetic head according to the embodiment, first, as shown in FIG. 1 and FIG. 2A, the insulating layer 2, the bottom read shield layer 3, and the bottom read shield gap film 4 are formed in this order on the substrate 1. Next, the MR element 5 and not-shown leads connected to the MR element 5 are formed on the bottom read shield gap film 4. The MR element 5 and the leads are then covered with the top read shield gap film 6. Next, the top read shield layer 7 and the nonmagnetic layer 8 are formed in this order on the top read shield gap film 6.

Next, the first return yoke layer 21 is formed on the nonmagnetic layer 8 by frame plating, for example. Next, a not-shown insulating layer is formed over the entire top surface of the stack. The insulating layer is then polished by, for example, chemical mechanical polishing (hereinafter referred to as CMP), until the first return yoke layer 21 is exposed. The top surface of the first return yoke layer 21 and that of the insulating layer around the same are thereby made even with each other.

Next, the insulating layer 22 is formed on the top surfaces of the first return yoke layer 21 and the surrounding insulating layer in an area where the first portion 11 of the coil is to be disposed later. The first portion 11 is then formed on the insulating layer 22 by frame plating, for example. Next, the coupling layers 61 and 65 are formed on the first return yoke layer 21 by frame plating, for example. Note that the first portion 11 may be formed after the formation of the coupling layers 61 and 65.

Next, the insulating layer 23 is formed around the first portion 11 and the coupling layer 61 and in the space between every adjacent turns of the first portion 11. Next, a not-shown insulating layer is formed over the entire top surface of the stack. The not-shown insulating layer is then polished by, for example, CMP, until the first portion 11 and the coupling layers 61 and 65 are exposed. The top surfaces of the first portion 11, the coupling layers 61 and 65, the insulating layer 23 and the not-shown insulating layer are thereby made even with each other.

Reference is now made to FIG. 8A through FIG. 14B to describe a series of steps, subsequent to the aforementioned step, down to the step of determining the shape of the top surface 12T of the main pole 12. FIG. 8A through FIG. 14B each show a stack of layers in the process of manufacturing the magnetic head. FIG. 8A to FIG. 14A each show a cross section perpendicular to the medium facing surface 30 and the top surface 1a of the substrate 1. FIG. 8B to FIG. 14B each show a cross section of the stack taken at the position where the medium facing surface 30 is to be formed. The parts that are closer to the substrate 1 than is the insulating layer 25 are not shown in FIG. 8A through FIG. 14B. The symbol "ABS" in FIG. 8A to FIG. 14A indicates the position where the medium facing surface 30 is to be formed.

Figure 8A:
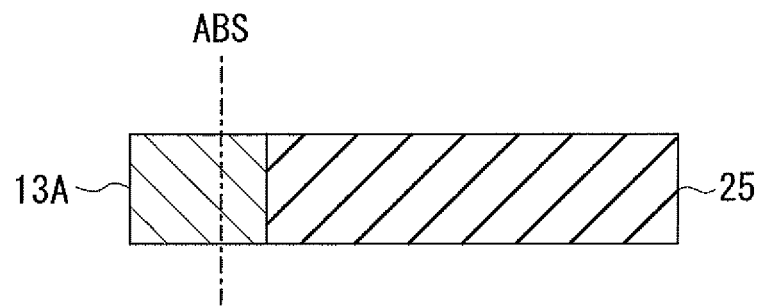
FIG. 8A and FIG. 8B are explanatory diagrams showing a step of a method of manufacturing the magnetic head according to the first embodiment of the invention.
Figure 8B:
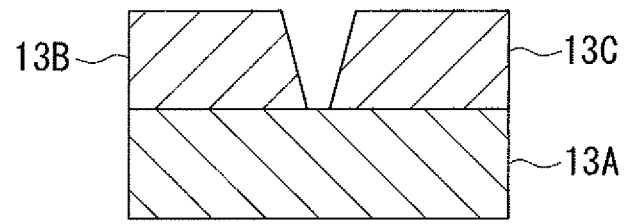

FIG. 8A and FIG. 8B show a step that follows the step of evening the top surfaces of the first portion 11, the coupling layers 61 and 65, the insulating layer 23 and the not-shown insulating layer. In this step, first, the bottom shield 13A is formed on the coupling layer 65, the coupling layer 62 is formed on the coupling layer 61, and the connection layer 51 is formed on the connection part 11a of the first portion 11, by performing frame plating, for example. Next, the insulating layer 25 is formed over the entire top surface of the stack. The insulating layer 25 is then polished by, for example, CMP, until the bottom shield 13A, the coupling layer 62 and the connection layer 51 are exposed. The top surfaces of the bottom shield 13A, the coupling layer 62, the connection layer 51 and the insulating layer 25 are thereby made even with each other.

Next, the side shields 13B and 13C are formed on the bottom shield 13A. Here, a method of forming the side shields 13B and 13C will be described by way of example. In the method, first, a photoresist layer made of a positive photoresist is patterned by photolithography to form a first resist layer on regions of the top surface of the bottom shield 13A where the side shields 13B and 13C are to be formed later. The first resist layer has two portions that have shapes corresponding to the shapes of the side shields 13B and 13C to be formed later. Next, a separating film made of a nonmagnetic material is formed to cover the first resist layer. The separating film is provided to prevent the first resist layer of a positive photoresist from being mixed with a photoresist layer of a negative photoresist to be formed later. Examples of materials suitable for the separating film include alumina and a synthetic resin.

Next, a second resist layer is formed on the separating film by patterning a photoresist layer of a negative photoresist by photolithography. The second resist layer is to later become a mold. The second resist layer has two openings that have shapes corresponding to the shapes of the side shields 13B and 13C to be formed later. Next, by performing wet etching, for example, the separating film is removed in the part thereof not covered by the second resist layer. The first and second resist layers are then exposed to light. Thereafter, the first resist layer is removed from the two openings of the second resist layer by using an alkaline developer, for example. When the first resist layer is removed or after the first resist layer has been removed, the separating film is removed in the part thereof extending along the wall faces of the two openings of the second resist layer. As a result of this step, the second resist layer becomes the mold which is formed in a region excluding the regions where the side shields 13B and 13C are to be formed later. Next, the side shields 13B and 13C are formed on the top surface of the bottom shield 13A by performing plating without forming any seed layer. The side shields 13B and 13C are respectively formed in the two openings of the mold. The mold and the separating film are then removed.

FIG. 8B shows the side shields 13B and 13C thus formed. The side shields 13B and 13C have mutually opposing sidewalls in the vicinity of the position ABS where the medium facing surface 30 is to be formed. The top surface of the bottom shield 13A is exposed between the sidewalls of the side shields 13B and 13C.

Figure 9A:
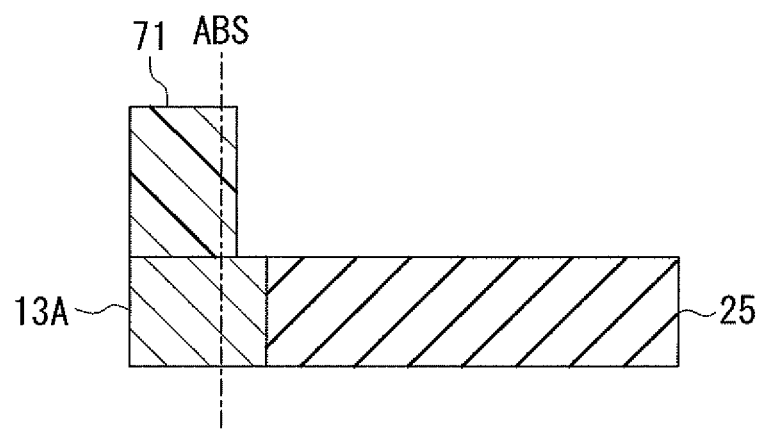
FIG. 9A and FIG. 9B are explanatory diagrams showing a step that follows the step shown in FIG. 8A and FIG. 8B.
Figure 9B:
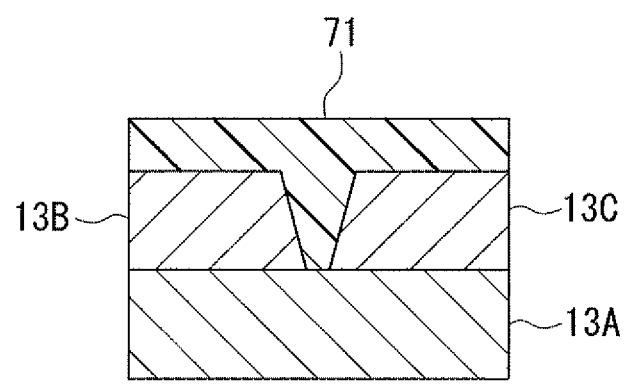

FIG. 9A and FIG. 9B show the next step. In this step, a mask 71 is formed over the bottom shield 13A and the side shields 13B and 13C. The mask 71 is formed by patterning a photoresist layer. As shown in FIG. 9A, the mask 71 does not cover a part of the bottom shield 13A located near the boundary between the bottom shield 13A and the insulating layer 25.

Figure 10A:
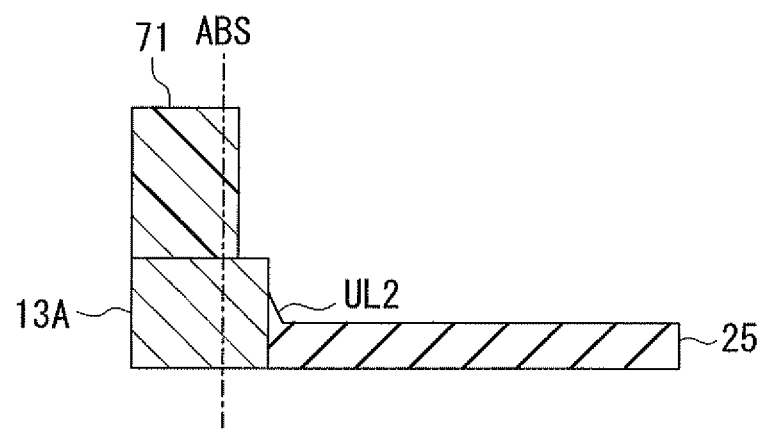
FIG. 10A and FIG. 10B are explanatory diagrams showing a step that follows the step shown in FIG. 9A and FIG. 9B.
Figure 10B:
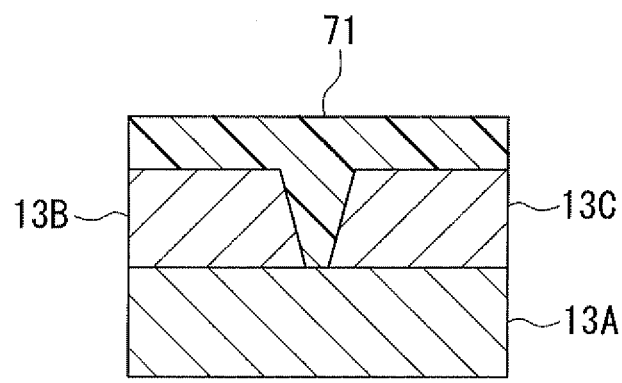

FIG. 10A and FIG. 10B show the next step. In this step, the insulating layer 25 is etched by using the mask 71 and the bottom shield 13A as an etching mask. The etching proceeds until the etched bottom reaches a level between the top and bottom surfaces of the insulating layer 25 unetched. The etching is performed by, for example, reactive ion etching under such a condition that a slope UL2 is formed by the etched insulating layer 25 at a position near the boundary between the bottom shield 13A and the insulating layer 25 unetched, as shown in FIG. 10A. The angle of inclination of the slope UL2 is equal to that of the second portion 12L2 of the bottom end 12L of the main pole 12 to be formed later. Next, the mask 71 is removed.

Figure 11A:
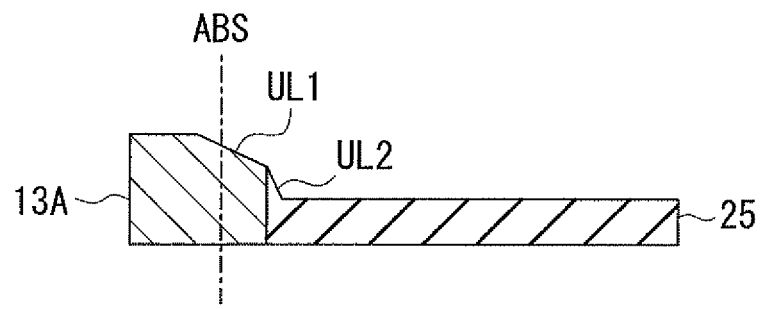
FIG. 11A and FIG. 11B are explanatory diagrams showing a step that follows the step shown in FIG. 10A and FIG. 10B.
Figure 11B:
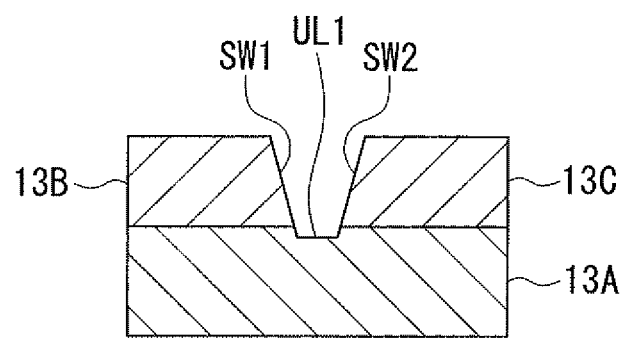

FIG. 11A and FIG. 11B show the next step. In this step, the mutually opposing sidewalls of the side shields 13B and 13C and the top surface of the bottom shield 13A are each partially etched in the vicinity of the position ABS where the medium facing surface 30 is to be formed. For example, ion beam etching is employed for this etching. The etching is performed such that a slope UL1 contiguous with the slope UL2 is formed in the top surface of the bottom shield 13A at a position between the mutually opposing sidewalls of the side shields 13B and 13C, as shown in FIG. 11A. The angle of inclination of the slope UL1 is equal to that of the first portion 12L1 of the bottom end 12L of the main pole 12 to be formed later. As shown in FIG. 11B, this etching determines the shape of the sidewalls SW1 and SW2 of the side shields 13B and 13C.

Figure 12A:
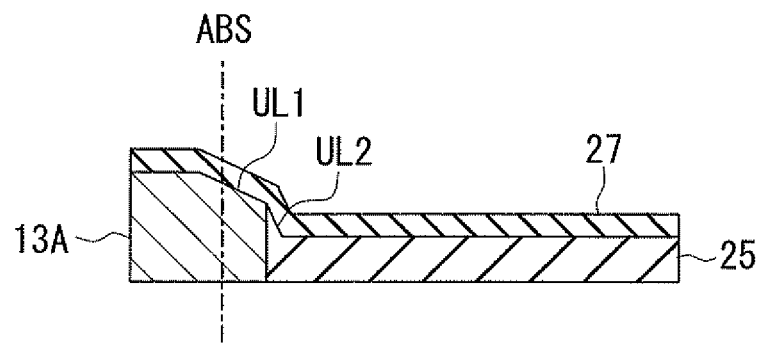
FIG. 12A and FIG. 12B are explanatory diagrams showing a step that follows the step shown in FIG. 11A and FIG. 11B.
Figure 12B:
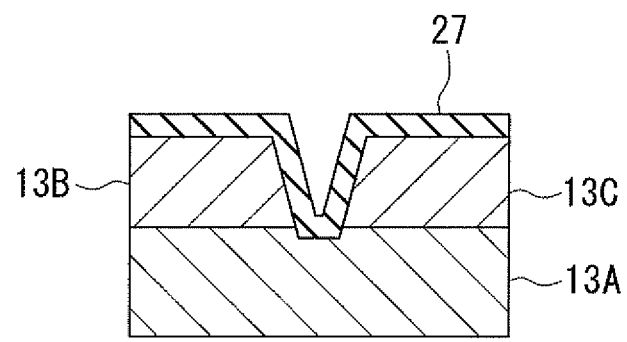

FIG. 12A and FIG. 12B show the next step. In this step, the first gap layer 27 is formed to cover the bottom shield 13A and the side shields 13B and 13C. Where alumina is selected as the material of the first gap layer 27, the first gap layer 27 is formed by atomic layer deposition, for example. Where Ru is selected as the material of the first gap layer 27, the first gap layer 27 is formed by chemical vapor deposition, for example.

Figure 13A:
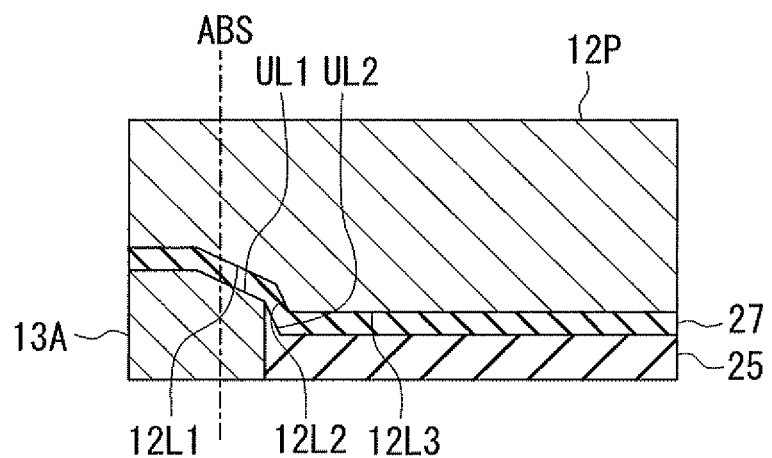
FIG. 13A and FIG. 13B are explanatory diagrams showing a step that follows the step shown in FIG. 12A and FIG. 12B.
Figure 13B:
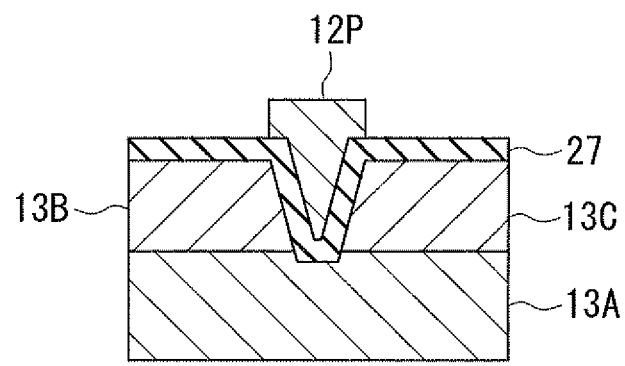

FIG. 13A and FIG. 13B show the next step. In this step, first, although not shown, a seed layer is formed over the entire top surface of the stack by sputtering or ion beam deposition, for example. Next, the first gap layer 27 and the seed layer are selectively etched to form therein openings for exposing the top surface of the coupling layer 62 and openings for exposing the top surface of the connection layer 51. Next, a magnetic layer 12P and the connection layer 52 are formed by frame plating, for example. The magnetic layer 12P is to later become the main pole 12. The magnetic layer 12P and the connection layer 52 are formed such that their top surfaces are higher in level than the top surfaces of portions of the seed layer lying on the side shields 13B and 13C.

Figure 14A:
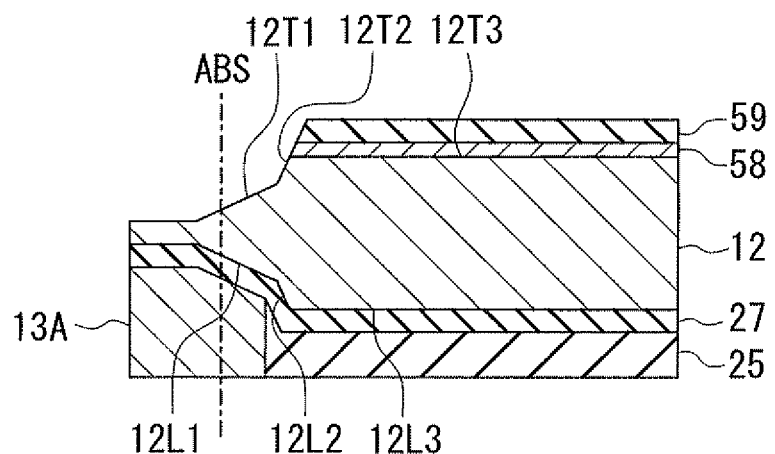
FIG. 14A and FIG. 14B are explanatory diagrams showing a step that follows the step shown in FIG. 13A and FIG. 13B.
Figure 14B:
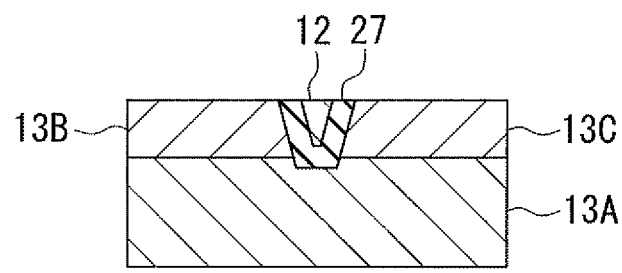

FIG. 14A and FIG. 14B show the next step. In this step, first, although not shown, the nonmagnetic layer 26 is formed to cover the first gap layer 27 and the magnetic layer 12P. The nonmagnetic layer 26 and the first gap layer 27 are then polished by, for example, CMP, until the side shields 13B and 13C are exposed. Next, a first mask layer and a second mask layer, which are to later become the nonmagnetic metal layer 58 and the insulating layer 59, respectively, are formed over the magnetic layer 12P and the side shields 13B and 13C. Using the first and second mask layers as an etching mask, the magnetic layer 12P, the side shields 13B and 13C and the first gap layer 27 are then partially etched by ion beam etching, for example. As a result, the first mask layer, the second mask layer, and the magnetic layer 12P become the nonmagnetic metal layer 58, the insulating layer 59, and the main pole 12, respectively.

Where ion beam etching is employed to partially etch the magnetic layer 12P, the side shields 13B and 13C and the first gap layer 27, the etching is performed such that ion beams travel in a direction at an angle of 40° to 75° with respect to the direction perpendicular to the top surface 1a of the substrate 1 and that the direction of travel of the ion beams is caused to rotate as viewed in the direction perpendicular to the top surface 1a of the substrate 1. As a result of such ion beam etching, the fourth portion 12T1, the fifth portion 12T2 and the sixth portion 12T3 are formed in the top surface of the magnetic layer 12P. The shape of the top surface 12T of the main pole 12 is thus determined.

Steps subsequent to the step of FIG. 14A and FIG. 14B will now be described with reference to FIG. 1 and FIG. 2A. First, the second gap layer 14 is formed over the entire top surface of the stack by sputtering or chemical vapor deposition, for example. Next, the second gap layer 14, the nonmagnetic metal layer 58 and the insulating layer 59 are selectively etched by, for example, ion beam etching, so that a part of the top surface 12T of the main pole 12, a part of each of the top surfaces of the side shields 13B and 13C, and the top surface of the connection layer 52 are exposed. Next, the top shield 13D is formed over the side shields 13B and 13C and the second gap layer 14, the coupling layer 63 is formed on the main pole 12, and the connection layer 53 is formed on the connection layer 52, by performing frame plating, for example.

Next, the nonmagnetic layer 46 is formed over the entire top surface of the stack. The nonmagnetic layer 46 is then polished by, for example, CMP, until the top shield 13D, the coupling layer 63 and the connection layer 53 are exposed. The top surfaces of the top shield 13D, the coupling layer 63, the connection layer 53 and the nonmagnetic layer 46 are thereby made even with each other.

Next, the insulating layer 17 is formed on the top surface of the nonmagnetic layer 46 in an area where the second portion 18 of the coil is to be disposed later. The second portion 18 is then formed on the insulating layer 17 by frame plating, for example. Next, the coupling layer 66 is formed over the top shield 13D and the nonmagnetic layer 46, and the coupling layer 64 is formed on the coupling layer 63, by performing frame plating, for example. Note that the second portion 18 may be formed after the formation of the coupling layers 64 and 66.

Next, the insulating layer 19 is formed around the second portion 18 and the coupling layer 64 and in the space between every adjacent turns of the second portion 18. Next, a not-shown insulating layer is formed over the entire top surface of the stack. The not-shown insulating layer is then polished by, for example, CMP, until the second portion 18 and the coupling layers 64 and 66 are exposed. The top surfaces of the second portion 18, the coupling layers 64 and 66, the insulating layer 19 and the not-shown insulating layer are thereby made even with each other.

Next, the insulating layer 20 is formed over the entire top surface of the stack by sputtering, for example. The insulating layer 20 is then selectively etched to form therein an opening for exposing the top surface of the coupling layer 64 and an opening for exposing the top surface of the coupling layer 66. Next, the second return yoke layer 29 is formed by frame plating, for example.

Next, the protection layer 42 is formed to cover the entire top surface of the stack. Wiring, terminals and other components are then formed on the protection layer 42, and the substrate 1 is cut near the position ABS. The cut surface is polished to form the medium facing surface 30, and then fabrication of flying rails and other processes are performed to complete the magnetic head.

The function and effects of the magnetic head according to the present embodiment will now be described. The magnetic head writes data on a recording medium with the write head and reads data written on the recording medium with the read head. In the write head, the coil including the first and second portions 11 and 18 produces magnetic fields corresponding to data to be written on the recording medium. A magnetic flux corresponding to the magnetic field produced by the first portion 11 passes through the coupling layers 61 and 62 and the main pole 12. A magnetic flux corresponding to the magnetic field produced by the second portion 18 passes through the coupling layers 64 and 63 and the main pole 12. Consequently, the main pole 12 allows the magnetic flux corresponding to the magnetic field produced by the first portion 11 and the magnetic flux corresponding to the magnetic field produced by the second portion 18 to pass.

The first and second portions 11 and 18 may be connected in series or in parallel. In either case, the first and second portions 11 and 18 are connected such that the magnetic flux corresponding to the magnetic field produced by the first portion 11 and the magnetic flux corresponding to the magnetic field produced by the second portion 18 flow in the same direction through the main pole 12.

The main pole 12 allows the magnetic fluxes corresponding to the magnetic fields produced by the coil to pass as mentioned above, and produces a write magnetic field for writing data on the recording medium by means of the perpendicular magnetic recording system.

The shield 13 captures a disturbance magnetic field applied to the magnetic head from the outside thereof. This allows preventing erroneous writing on the recording medium induced by the disturbance magnetic field intensively captured into the main pole 12. The shield 13 also functions to capture a magnetic flux that is produced from the end face of the main pole 12 and that expands in directions other than the direction perpendicular to the plane of the recording medium, and to thereby prevent the magnetic flux from reaching the recording medium.

The shield 13, the first return yoke layer 21, the second return yoke layer 29 and the coupling layers 61 to 66 have the function of returning a magnetic flux that has been produced from the end face of the main pole 12 and has magnetized the recording medium. More specifically, a part of the magnetic flux that has been produced from the end face of the main pole 12 and has magnetized the recording medium returns to the main pole 12 through the shield 13, the coupling layer 65, the first return yoke layer 21 and the coupling layers 61 and 62. Another part of the magnetic flux that has been produced from the end face of the main pole 12 and has magnetized the recording medium returns to the main pole 12 through the shield 13, the coupling layer 66, the second return yoke layer 29 and the coupling layers 64 and 63.

The shield 13 includes the bottom shield 13A, the first side shield 13B, the second side shield 13C, and the top shield 13D. The bottom shield 13A has an end face that is located in the medium facing surface 30 at a position backward of the end face of the main pole 12 along the direction T of travel of the recording medium. The first and second side shields 13B and 13C have two end faces that are located in the medium facing surface 30 at positions on opposite sides of the end face of the main pole 12 in the track width direction TW. The top shield 13D has an end face that is located in the medium facing surface 30 at a position forward of the end face of the main pole 12 along the direction T of travel of the recording medium. The present embodiment thus makes it possible that, in regions both backward and forward of the end face of the main pole 12 along the direction T of travel of the recording medium and regions on opposite sides of the end face of the main pole 12 in the track width direction TW, a magnetic flux that is produced from the end face of the main pole 12 and expands in directions other than the direction perpendicular to the plane of the recording medium can be captured and thereby prevented from reaching the recording medium. Consequently, the present embodiment allows preventing the occurrence of adjacent track erase resulting from a skew. The bottom shield 13A and the top shield 13D contribute to an increase in the gradient of the write magnetic field, as well as the prevention of adjacent track erase resulting from a skew. The side shields 13B and 13C greatly contribute to the prevention of adjacent track erase, in particular. By virtue of such a function of the shield 13, the present embodiment allows increasing the recording density.

Furthermore, as shown in FIG. 2B, the present embodiment is configured so that in the medium facing surface 30, the distance between the first and second side parts SP1 and SP2 of the main pole 12 in the track width direction TW, i.e., the width of the end face of the main pole 12, decreases with increasing proximity to the top surface 1a of the substrate 1. According to the present embodiment, this feature also serves to prevent the occurrence of adjacent track erase resulting from a skew.

The present embodiment is also configured so that in the medium facing surface 30, the distance between the first and second sidewalls SW1 and SW2 of the side shields 13B and 13C in the track width direction TW decreases with increasing proximity to the top surface 1a of the substrate 1, as does the distance between the first and second side parts SP1 and SP2 of the main pole 12. The present embodiment thus makes it possible that the distance between the first side part SP1 and the first sidewall SW1 and the distance between the second side part SP2 and the second sidewall SW2 are both small and constant in the medium facing surface 30. This configuration allows the side shields 13B and 13C to effectively capture the magnetic flux that is produced from the end face of the main pole 12 and expands to opposite sides in the track width direction TW. As a result, the present embodiment can enhance the function of the side shields 13B and 13C in particular, and thereby prevent the skew-induced adjacent track erase more effectively.

The shield 13 cannot capture much magnetic flux if there is no magnetic connection between the shield 13 and any magnetic layer having a sufficiently large volume enough to accommodate the magnetic flux that has been captured by the shield 13. In the present embodiment, there are provided the first return path section 60 (the coupling layer 65, the first return yoke layer 21, and the coupling layers 61 and 62) which magnetically couples the bottom shield 13A and the main pole 12 to each other, and the second return path section 67 (the coupling layer 66, the second return yoke layer 29, and the coupling layers 63 and 64) which magnetically couples the top shield 13D and the main pole 12 to each other. Such a configuration allows the magnetic flux having been captured by the shield 13 to flow into the main pole 12 by way of the first and second return path sections 60 and 67. In the present embodiment, the first and second return path sections 60 and 67 and the main pole 12, which are magnetic layers large in volume, are magnetically connected to the shield 13. The present embodiment thus allows the shield 13 to capture much magnetic flux, so that the above-described effect of the shield 13 can be exerted effectively.

Furthermore, the present embodiment is provided with the bottom shield 13A, in addition to the first return path section 60. In the main cross section, the first return path section 60 is greater than the bottom shield 13A in length in the direction perpendicular to the medium facing surface 30. The first portion 11 of the coil passes through the space defined by the main pole 12 and the first return path section 60. According to the present embodiment, such a structure is more advantageous than a structure where the first return yoke layer 21 also functions as the bottom shield. That is, in the present embodiment, the bottom shield 13A and the main pole 12 can be brought into sufficiently close proximity to each other. This enhances the function of the shield 13, and in particular, the function of the bottom shield 13A.

Now, a description will be made as to the role of the coupling layer 65. First, suppose that there is provided no coupling layer 65, so that the bottom shield 13A and the first return yoke layer 21 are not magnetically coupled to each other. In this case, the magnetic flux that has been captured by the bottom shield 13A or the side shields 13B and 13C and directed downward cannot flow toward the first return yoke layer 21, and thus returns so as to proceed upward. This causes the bottom shield 13A or the side shields 13B and 13C to produce upwardly and downwardly directed magnetic fluxes. As a result, part of the magnetic flux captured by the bottom shield 13A or the side shields 13B and 13C leaks out of the medium facing surface 30. This may cause adjacent track erase. In contrast to this, if the bottom shield 13A and the first return yoke layer 21 are magnetically coupled to each other by the coupling layer 65, the magnetic flux captured by the side shields 13B and 13C is divided to flow upward and downward, and the magnetic flux captured by the bottom shield 13A is mainly directed downward. This can prevent the occurrence of adjacent track erase that is caused by part of the magnetic flux captured by the bottom shield 13A or the side shields 13B and 13C being leaked out of the medium facing surface 30.

If the bottom shield 13A is excessively long in the direction perpendicular to the medium facing surface 30 in the main cross section, flux leakage from the main pole 12 to the bottom shield 13A increases and the main pole 12 thus becomes unable to direct much magnetic flux to the medium facing surface 30. It is therefore necessary that the bottom shield 13A is not excessively long in the direction perpendicular to the medium facing surface 30 in the main cross section. In the main cross section, if the length of the coupling layer 65 in the direction perpendicular to the medium facing surface 30 is equal to or smaller than that of the bottom shield 13A, the coupling layer 65 cannot direct much magnetic flux from the bottom shield 13A to the first return yoke layer 21. In contrast to this, the present embodiment is configured so that in the main cross section the coupling layer 65 is greater than the bottom shield 13A and smaller than the first return yoke layer 21 in length in the direction perpendicular to the medium facing surface 30. Consequently, the present embodiment allows the coupling layer 65 to direct much magnetic flux from the bottom shield 13A to the first return yoke layer 21.

Furthermore, in the present embodiment, the bottom end 12L of the main pole 12 includes the first portion 12L1, the second portion 12L2, and the third portion 12L3 that are contiguously arranged in order of increasing distance from the medium facing surface 30. The top surface 12T of the main pole 12 includes the fourth portion 12T1, the fifth portion 12T2, and the sixth portion 12T3 that are contiguously arranged in order of increasing distance from the medium facing surface 30. The distance from the top surface 1a of the substrate 1 to any given point on each of the first and second portions 12L1 and 12L2 decreases with increasing distance from the given point to the medium facing surface 30. The distance from the top surface 1a of the substrate 1 to any given point on each of the fourth and fifth portions 12T1 and 12T2 increases with increasing distance from the given point to the medium facing surface 30. Consequently, the present embodiment allows the main pole 12 to have a small thickness in the medium facing surface 30. It is thus possible to prevent the skew-induced adjacent track erase. The present embodiment further allows the main pole 12 to have a great thickness in the part away from the medium facing surface 30. This allows the main pole 12 to direct much magnetic flux to the medium facing surface 30, and consequently allows improving write characteristics such as overwrite property.

In the present embodiment, the angle of inclination $\theta_{L2}$ of the second portion 12L2 with respect to the direction perpendicular to the medium facing surface 30 is greater than the angle of inclination $\theta_{L1}$ of the first portion 12L1 with respect to the direction perpendicular to the medium facing surface 30. Also, the angle of inclination $\theta_{T2}$ of the fifth portion 12T2 with respect to the direction perpendicular to the medium facing surface 30 is greater than the angle of inclination $\theta_{T1}$ of the fourth portion 12T1 with respect to the direction perpendicular to the medium facing surface 30. According to the present embodiment, this configuration allows preventing the skew-induced problems and improving write characteristics as mentioned above, while suppressing variations in write characteristics associated with changes in level of the medium facing surface 30. This effect will be described in more detail below.

First, consider a main pole of a comparative example whose shape is as described below. The main pole of the comparative example has a bottom end that has a first slope instead of the first and second portions 12L1 and 12L2 of the present embodiment. The first slope has a constant angle of inclination with respect to the direction perpendicular to the medium facing surface 30. The distance from the top surface 1a of the substrate 1 to any given point on the first slope decreases with increasing distance from the given point to the medium facing surface 30. The main pole of the comparative example has a top surface that has a second slope instead of the fourth and fifth portions 12T1 and 12T2 of the present embodiment. The second slope has a constant angle of inclination with respect to the direction perpendicular to the medium facing surface 30. The distance from the top surface 1a of the substrate 1 to any given point on the second slope increases with increasing distance from the given point to the medium facing surface 30.

Suppose that the first and second slopes of the main pole of the comparative example have angles of inclination as small as $\theta_{L1}$ and $\theta_{T1}$, for example. In this case, to make the maximum thickness of the main pole as great as that of the main pole 12 of the present embodiment, the first and second slopes need to be made longer. It is not easy to form such a main pole, however. Accordingly, in this case, it is difficult to increase the thickness of the main pole in the part away from the medium facing surface 30. This leads to degradation of write characteristics.

On the other hand, if the first and second slopes of the main pole of the comparative example have angles of inclination as great as $\theta_{L2}$ and $\theta_{T2}$, a change in level of the medium facing surface 30 to be formed by polishing causes a great change in thickness of the main pole at the medium facing surface 30. This results in significant variations in write characteristics.

As such, with the main pole of the comparative example, it is difficult to prevent the skew-induced problems and to improve write characteristics while suppressing variations in write characteristics associated with changes in level of the medium facing surface 30.

In contrast to this, for the main pole 12 of the present embodiment, the first and fourth portions 12L1 and 12T1 are made to have small angles of inclination $\theta_{L1}$ and $\theta_{T1}$ to thereby suppress variations in write characteristics associated with changes in level of the medium facing surface 30. Furthermore, for the main pole 12, the second and fifth portions 12L2 and 12T2 are made to have great angles of inclination $\theta_{L2}$ and $\theta_{T2}$ to thereby provide a great distance D2 between the third portion 12L3 and the sixth portion 12T3 while achieving a small thickness D1 of the main pole 12 in the medium facing surface 30 shown in FIG. 7. This allows preventing the skew-induced problems and improving write characteristics. Consequently, according to the present embodiment, it is possible to prevent the skew-induced problems and to improve write characteristics while suppressing variations in write characteristics associated with changes in level of the medium facing surface 30.

Figure 15:
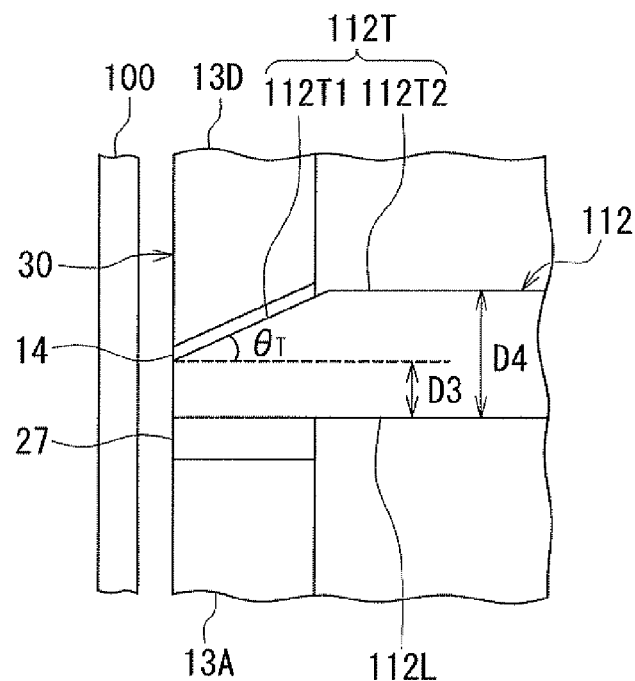
FIG. 15 is an explanatory diagram showing a model of a first comparative example for simulations.
Figure 16:
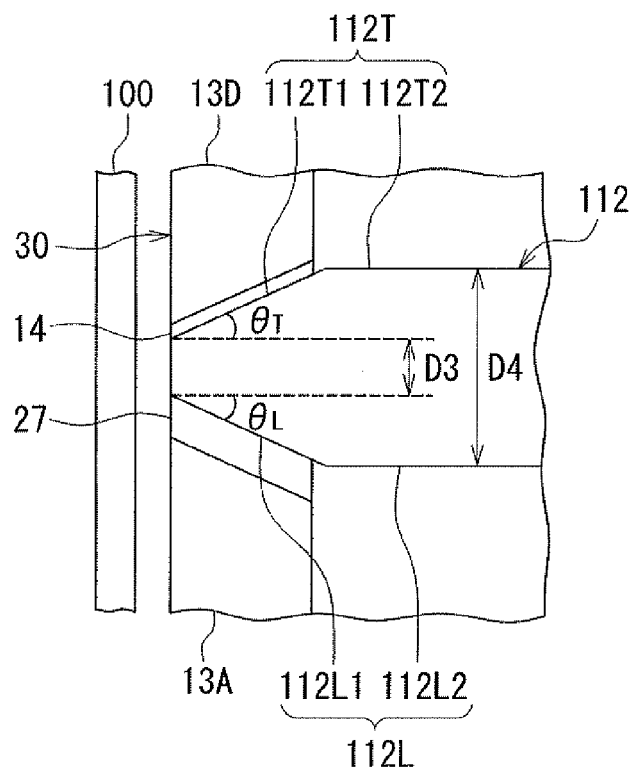
FIG. 16 is an explanatory diagram showing a model of a second comparative example for simulations.
Figure 17:
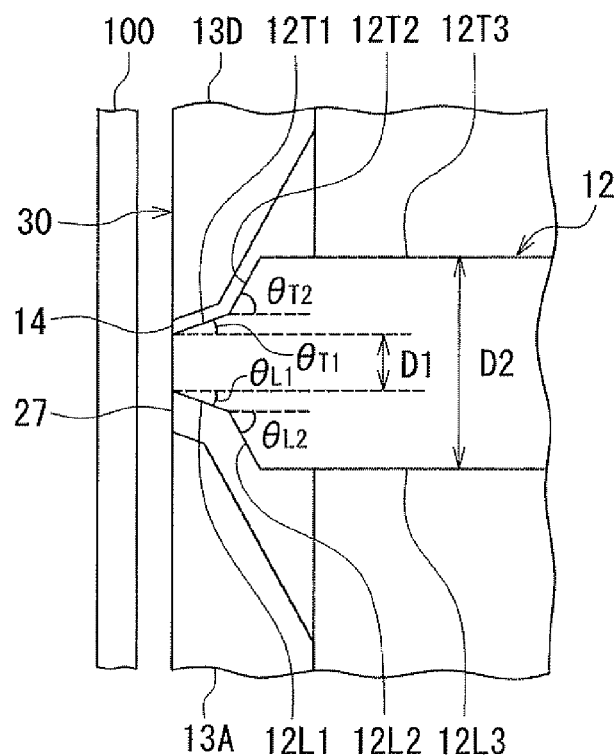
FIG. 17 is an explanatory diagram showing a model of a first practical example for simulations.
Figure 18:
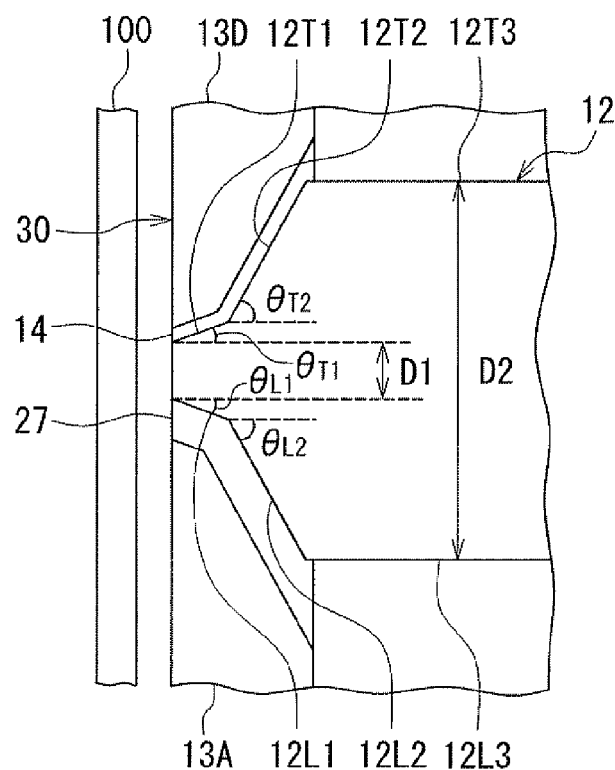
FIG. 18 is an explanatory diagram showing a model of a second practical example for simulations.
Figure 19:
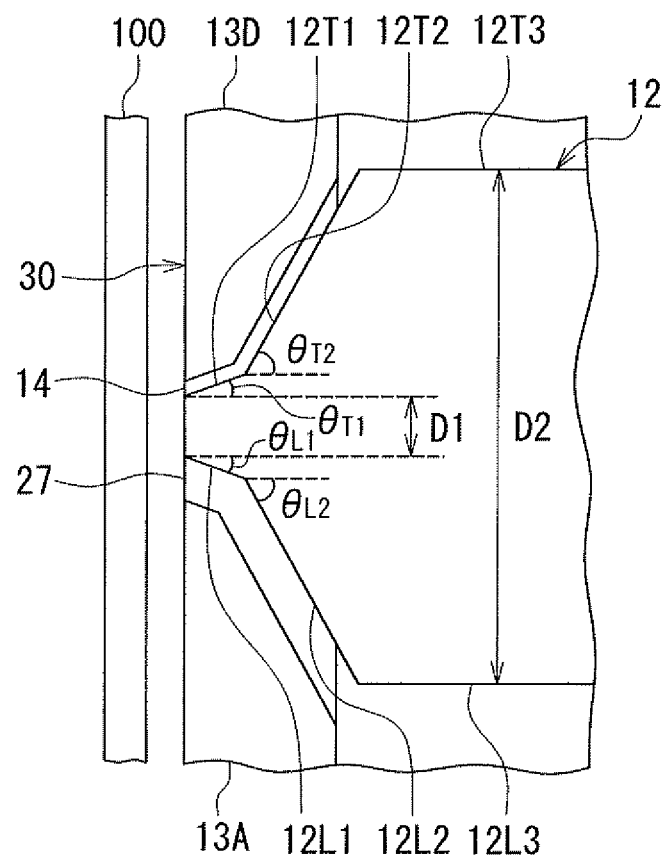
FIG. 19 is an explanatory diagram showing a model of a third practical example for simulations.

A description will now be given of simulation results that demonstrate the effects of the aforementioned shape of the main pole 12 of the present embodiment. FIG. 15 to FIG. 19 show main pole models that were used in the simulations. FIG. 15 shows a main pole 112 of a first comparative example. FIG. 16 shows a main pole 112 of a second comparative example. FIG. 17 shows a main pole 12 of a first practical example. FIG. 18 shows a main pole 12 of a second practical example. FIG. 19 shows a main pole 12 of a third practical example. Each of the main poles 12 of the first to third practical examples corresponds to the main pole 12 of the present embodiment. Reference numeral 100 in FIG. 15 to FIG. 19 indicates a recording medium.

The main pole 112 of the first comparative example shown in FIG. 15 has a bottom end 112L instead of the bottom end 12L of the main pole 12 of the present embodiment. The bottom end 112L extends in the direction perpendicular to the medium facing surface 30. The main pole 112 of the first comparative example further has a top surface 112T instead of the top surface 12T of the main pole 12 of the present embodiment. The top surface 112T includes a first portion 112T1 and a second portion 112T2 that are contiguously arranged in order of increasing distance from the medium facing surface 30. The distance from the top surface 1a of the substrate 1 to any given point on the first portion 112T1 increases with increasing distance from the given point to the medium facing surface 30. However, the first portion 112T1 has a constant angle of inclination $\theta_T$ with respect to the direction perpendicular to the medium facing surface 30. The second portion 112T2 extends in a direction substantially perpendicular to the medium facing surface 30.

The main pole 112 of the second comparative example shown in FIG. 16 has a bottom end 112L instead of the bottom end 12L of the main pole 12 of the present embodiment. The bottom end 112L includes a first portion 112L1 and a second portion 112L2 that are contiguously arranged in order of increasing distance from the medium facing surface 30. The distance from the top surface 1a of the substrate 1 to any given point on the first portion 112L1 decreases with increasing distance from the given point to the medium facing surface 30. However, the first portion 112L1 has a constant angle of inclination $\theta_L$ with respect to the direction perpendicular to the medium facing surface 30. The second portion 112L2 extends in a direction substantially perpendicular to the medium facing surface 30. The main pole 112 of the second comparative example further has a top surface 112T instead of the top surface 12T of the main pole 12 of the present embodiment. The top surface 112T is of identical shape with that in the first comparative example.

As shown in FIG. 15 and FIG. 16, for each of the main poles 112 of the first and second comparative examples, let D3 be the thickness (length in the direction perpendicular to the top surface 1a of the substrate 1) of the main pole 112 at the medium facing surface 30, and D4 be the maximum thickness of the main pole 112. For the main pole 112 of the first comparative example shown in FIG. 15, D3 is 100 nm, D4 is 220 nm, and $\theta_T$ is 24°. For the main pole 112 of the second comparative example shown in FIG. 16, D3 is 100 nm, D4 is 320 nm, and $\theta_L$ and $\theta_T$ are both 24°.

For each of the main poles 12 of the first to third practical examples shown in FIG. 17 to FIG. 19, D1 is 100 nm, $\theta_{L1}$ and $\theta_{T1}$ are both 20°, and $\theta_{L2}$ and $\theta_{T2}$ are both 60°. D2 is 390 nm for the main pole 12 of the first practical example, 670 nm for the main pole 12 of the second practical example, and 850 nm for the main pole 12 of the third practical example.

Figure 20:
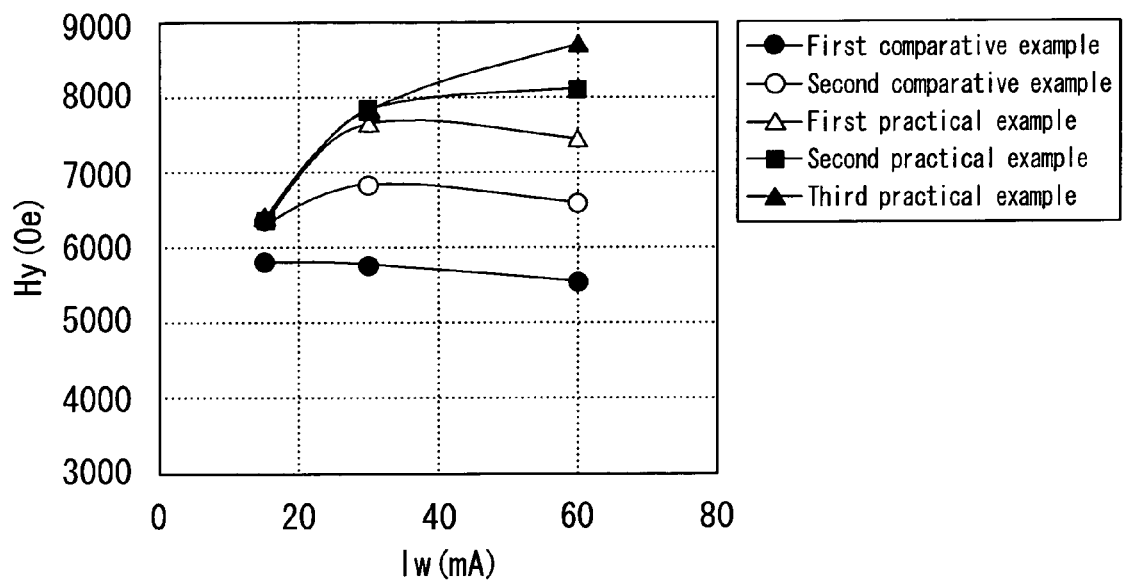
FIG. 20 is a characteristic chart showing the simulation results.
Figure 21:
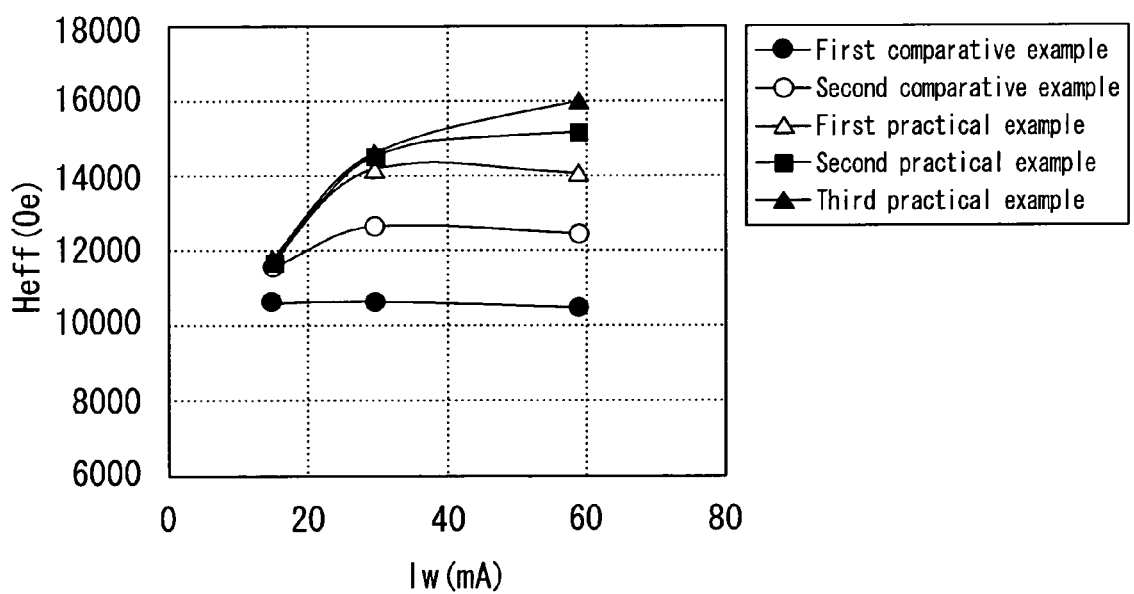
FIG. 21 is a characteristic chart showing the simulation results.
Figure 22:
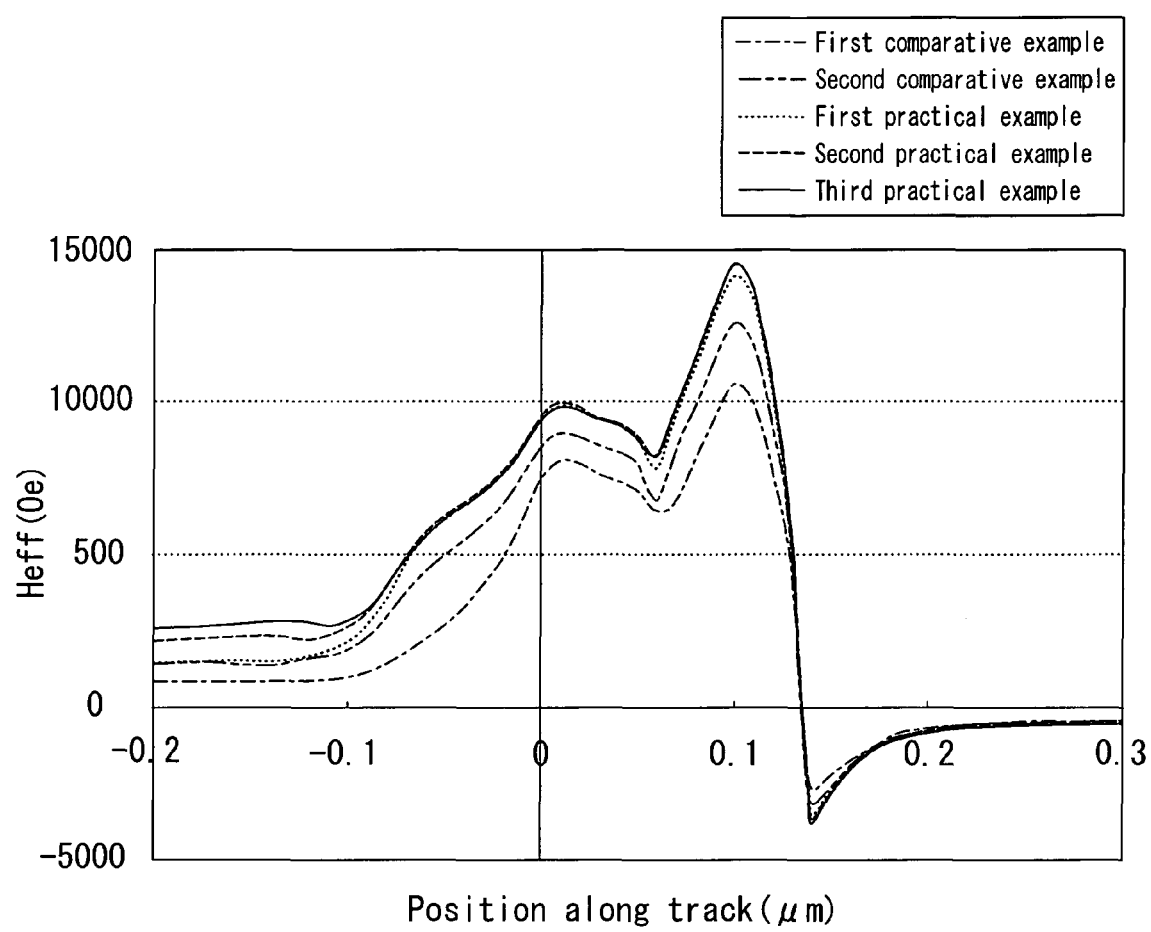
FIG. 22 is a characteristic chart showing the simulation results.

The simulations were performed to determine the write magnetic field with write currents Iw (mA) of different magnitude for the five models shown in FIG. 15 to FIG. 19. FIG. 20 to FIG. 22 show the results of the simulations. FIG. 20 shows the relationship between the write current Iw (mA) and the write magnetic field component Hy (Oe) in a direction perpendicular to the medium facing surface 30. Note that 1 Oe is 79.6 A/m. FIG. 21 shows the relationship between the write current Iw (mA) and the effective write magnetic field Heff (Oe). The write magnetic fields shown in FIG. 20 and FIG. 21 were determined at the position along the track at which the medium facing surface 30 and the top surface of the main pole intersect. The effective write magnetic field Heff refers to the write magnetic field that effectively acts on the magnetic recording layer of the recording medium 100 in order to form recording bits by reversing the magnetization of the magnetic recording layer. Heff can be expressed by the equation below:

$$Heff=(Hy^{2/3}+Hp^{2/3})^{3/2}$$

where Hp is the write magnetic field component in a direction parallel to the medium facing surface 30.

FIG. 22 shows the relationship between the position (μm) along the track at which the write magnetic field was determined and the effective write magnetic field Heff (Oe) when the write current Iw was 30 mA. The position along the track in FIG. 22 is expressed as follows. That is, the position at which the medium facing surface 30 and the bottom end of the main pole intersect is defined as 0 (zero) position. Any point forward of the zero position along the direction T of travel of the recording medium (on the trailing side) is expressed as a positive value. Any point backward of the zero position along the direction T of travel of the recording medium (on the leading side) is expressed as a negative value.

As shown in FIG. 20 to FIG. 22, at least when the write current Iw falls within the range of 30 to 60 mA, the write magnetic field from the main pole 12 of each of the first to third practical examples is greater than the write magnetic field from the main pole 112 of each of the first and second comparative examples. This result shows that the use of the main pole 12 of the present embodiment can improve write characteristics.

For each of the main poles 112 of the first and second comparative examples, $\theta_L$ and $\theta_T$ may be increased to thereby increase the maximum thickness D4 of the main pole 112 in order to increase the write magnetic field. In this case, however, a change in level of the medium facing surface 30 to be formed by polishing causes a great change in thickness of the main pole 112 at the medium facing surface 30, and this results in significant variations in write characteristics, as has been already described. Additionally, to increase the maximum thickness D4 of the main pole 112 while making $\theta_L$ and $\theta_T$ small for the main pole 112 of the first and second comparative examples, the first portions 112T1 and 112L1 need to be made longer. However, such a main pole cannot be formed easily, as has been already mentioned.

Second Embodiment

Figure 23:
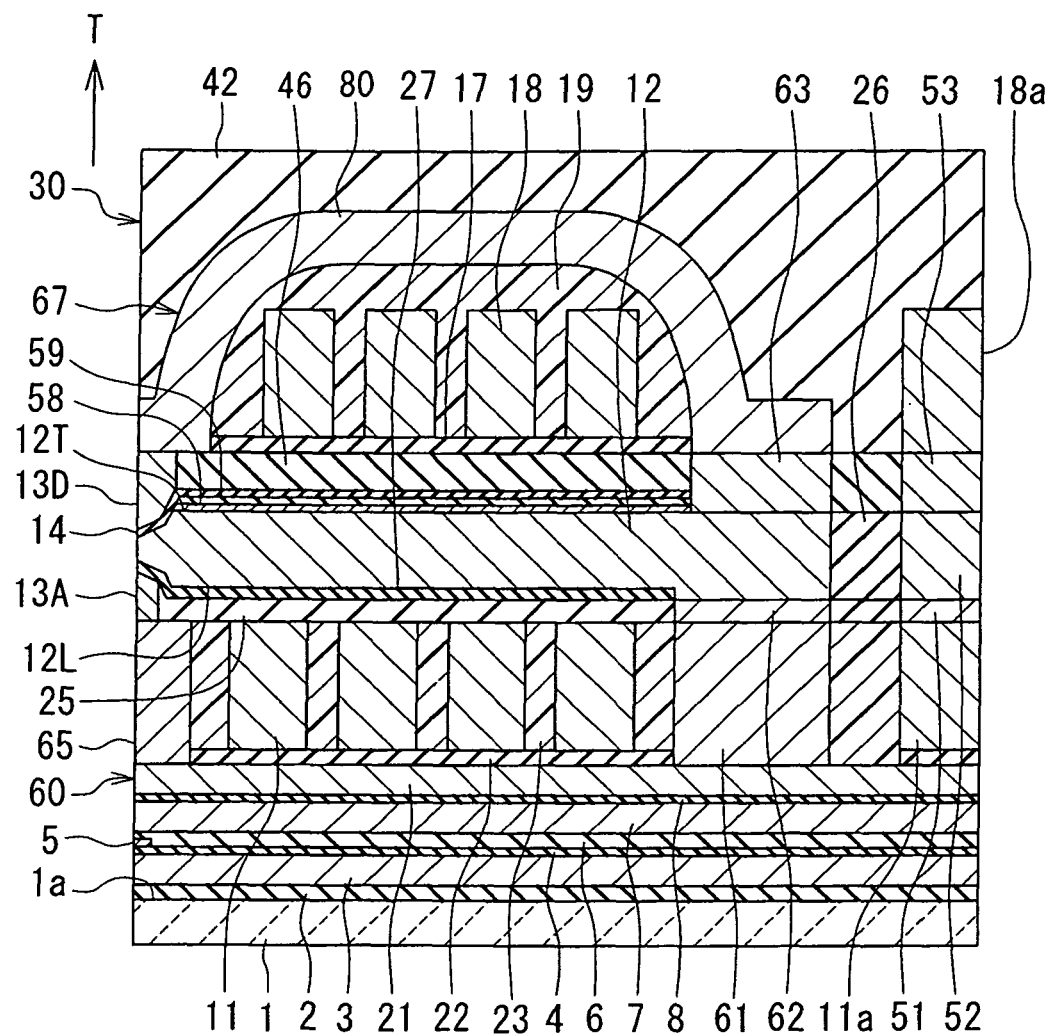
FIG. 23 is a cross-sectional view of a magnetic head according to a second embodiment of the invention.

A magnetic head according to a second embodiment of the invention will now be described with reference to FIG. 23. FIG. 23 is a cross-sectional view of the magnetic head according to the present embodiment. FIG. 23 shows a cross section perpendicular to the medium facing surface and the top surface of the substrate, or the main cross section, in particular.

The magnetic head according to the present embodiment is different from the magnetic head according to the first embodiment in the following respects. In the magnetic head according to the present embodiment, the insulating layer 19 is configured to cover the second portion 18 of the coil. In the present embodiment, the insulating layer 20 of the first embodiment is not provided. The magnetic head according to the present embodiment has a second return yoke layer 80 made of a magnetic material, instead of the coupling layer 66, the second return yoke layer 29 and the coupling layer 64 of the first embodiment. The second return yoke layer 80 is provided to magnetically couple the top shield 13D and the coupling layer 63 to each other. The second return yoke layer 80 has an end face located in the medium facing surface 30. Examples of materials that can be used for the second return yoke layer 80 include CoFeN, CoNiFe, NiFe, and CoFe.

In the present embodiment, the second return yoke layer 80 and the coupling layer 63 constitute the second return path section 67 which connects the top shield 13D and the main pole 12 to each other. The second portion 18 of the coil passes through the space defined by the main pole 12 and the second return path section 67.

The remainder of configuration, function and effects of the present embodiment are similar to those of the first embodiment.

Third Embodiment

Figure 24:
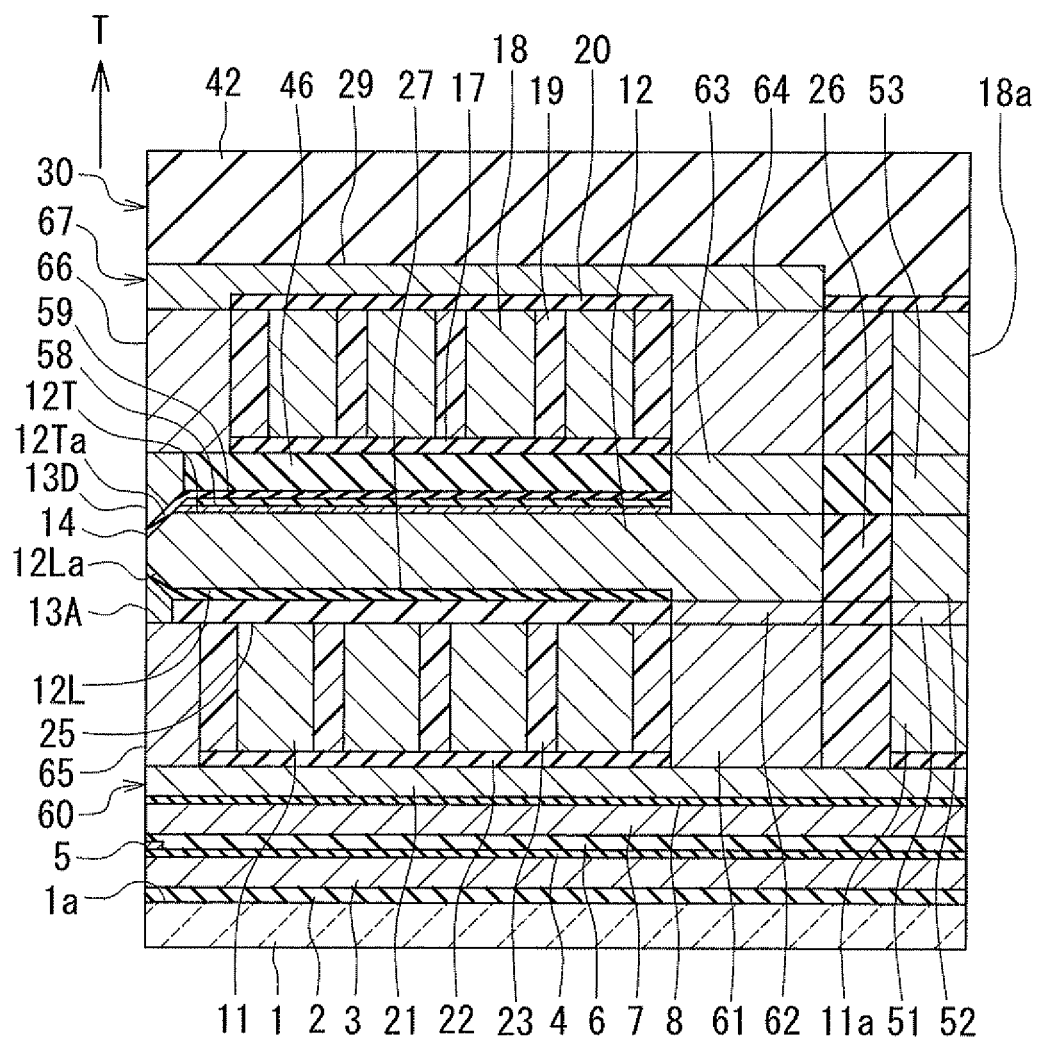
FIG. 24 is a cross-sectional view of a magnetic head according to a third embodiment of the invention.

A magnetic head according to a third embodiment of the invention will now be described with reference to FIG. 24. FIG. 24 is a cross-sectional view of the magnetic head according to the present embodiment. FIG. 24 shows a cross section perpendicular to the medium facing surface and the top surface of the substrate, or the main cross section, in particular.

The magnetic head according to the present embodiment is different from the magnetic head according to the first embodiment in the following respects. In the magnetic head according to the present embodiment, the bottom end 12L of the main pole 12 includes an inclined portion 12La instead of the first and second portions 12L1 and 12L2. Accordingly, the inclined portion 12La is disposed between the third portion 12L3 of the first embodiment and the medium facing surface 30. The inclined portion 12La has an end located in the medium facing surface 30. The inclined portion 12La may be an edge formed by two intersecting planes, or may be a plane connecting two planes to each other. The distance from the top surface 1a of the substrate 1 to any given point on the inclined portion 12La decreases with increasing distance from the given point to the medium facing surface 30. However, the inclined portion 12La has a constant angle of inclination with respect to the direction perpendicular to the medium facing surface 30.

The bottom shield 13A has a top surface that is opposed to the inclined portion 12La with the gap part (the first gap layer 27) interposed therebetween. The distance from the top surface 1a of the substrate 1 to any given point on the top surface of the bottom shield 13A decreases with increasing distance from the given point to the medium facing surface 30.

Furthermore, in the magnetic head according to the present embodiment, the top surface 12T of the main pole 12 includes an inclined surface 12Ta instead of the fourth and fifth portions 12T1 and 12T2. Accordingly, the inclined surface 12Ta is disposed between the sixth portion 12T3 of the first embodiment and the medium facing surface 30. The inclined surface 12Ta has an end located in the medium facing surface 30. The distance from the top surface 1a of the substrate 1 to any given point on the inclined surface 12Ta increases with increasing distance from the given point to the medium facing surface 30. However, the inclined surface 12Ta has a constant angle of inclination with respect to the direction perpendicular to the medium facing surface 30.

The top shield 13D has a bottom surface that is opposed to the inclined surface 12Ta with the gap part (the second gap layer 14) interposed therebetween. The distance from the top surface 1a of the substrate 1 to any given point on the bottom surface of the top shield 13D increases with increasing distance from the given point to the medium facing surface 30.

The present embodiment cannot provide the effects of the first embodiment that are produced by the bottom end 12L of the main pole 12 including the first and second portions 12L1 and 12L2 and the top surface 12T of the main pole 12 including the fourth and fifth portions 12T1 and 12T2. The remainder of configuration, function and effects of the present embodiment are similar to those of the first embodiment.

Fourth Embodiment

Figure 25:
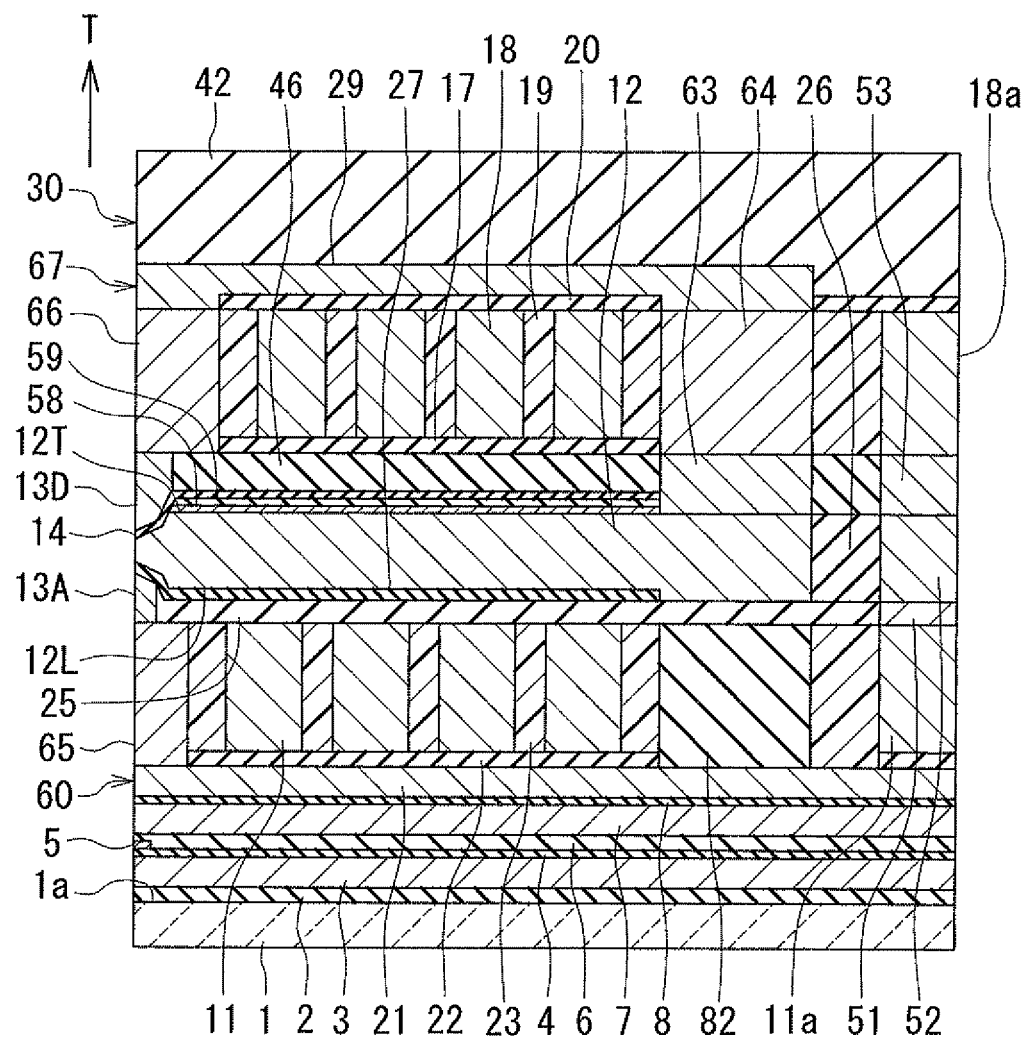
FIG. 25 is a cross-sectional view of a magnetic head according to a fourth embodiment of the invention.

A magnetic head according to a fourth embodiment of the invention will now be described with reference to FIG. 25. FIG. 25 is a cross-sectional view of the magnetic head according to the present embodiment. FIG. 25 shows a cross section perpendicular to the medium facing surface and the top surface of the substrate, or the main cross section, in particular.

The magnetic head according to the present embodiment is different from the magnetic head according to the first embodiment in the following respects. The magnetic head according to the present embodiment does not have the coupling layers 61 and 62. The magnetic head according to the present embodiment has an insulating layer 82 disposed around the insulating layer 23 and the coupling layer 65. In the present embodiment, the insulating layer 82 exists in the area where the coupling layer 61 is found in the first embodiment, while the insulating layer 25 exists in the area where the coupling layer 62 is found in the first embodiment. Consequently, the first return yoke layer 21 is not magnetically connected to the main pole 12. In the present embodiment, the first return path section 60 is composed of the coupling layer 65 and the first return yoke layer 21. The first return path section 60 of the present embodiment is magnetically connected to the bottom shield 13A but not to the main pole 12. Therefore, the first return path section 60 does not magnetically couple the bottom shield 13A and the main pole 12 to each other.

In the present embodiment, the bottom shield 13A is magnetically connected to the first return path section 60 which is composed of the coupling layer 65 and the first return yoke layer 21 and is large in volume. Like the first embodiment, the present embodiment thus allows the shield 13 to capture much magnetic flux, so that the effect of the shield 13 can be exerted effectively. The remainder of configuration, function and effects of the present embodiment are similar to those of the first embodiment.

The present invention is not limited to the foregoing embodiments, and various modifications may be made thereto. For example, the first portion 11 and the second portion 18 of the coil need not necessarily be formed into a planar spiral shape, and may each be configured to include a plurality of coil elements extending in a direction generally parallel to the medium facing surface 30. The plurality of coil elements of the first portion 11 and the plurality of coil elements of the second portion 18 may be connected to each other to form a coil that is helically wound around the main pole 12.

The main pole 12, the bottom shield 13A and the top shield 13D of each of the first, second and fourth embodiments may be shaped like those of the third embodiment.

In each of the second and third embodiments, the first return yoke layer 21 may be configured not to be magnetically connected to the main pole 12, as in the fourth embodiment.

While the foregoing embodiments has been described with reference to a magnetic head having a structure where the read head is formed on the base body and the write head is stacked on the read head, the read head and the write head may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiment.

What is claimed is:

1. A magnetic head for perpendicular magnetic recording, comprising:
a medium facing surface that faces a recording medium;
a coil that produces a magnetic field corresponding to data to be written on the recording medium;

a main pole that has an end face located in the medium facing surface, allows a magnetic flux corresponding to the magnetic field produced by the coil to pass, and produces a write magnetic field for writing the data on the recording medium by means of a perpendicular magnetic recording system;

a shield made of a magnetic material and having an end face that is located in the medium facing surface to wrap around the end face of the main pole;

a gap part made of a nonmagnetic material and provided between the main pole and the shield;

a first return path section and a second return path section each made of a magnetic material; and a substrate on which the coil, the main pole, the shield, the gap part, the first return path section, and the second return path section are stacked, the substrate having a top surface, wherein:

the shield includes a bottom shield, first and second side shields, and a top shield;

the bottom shield has an end face that is located in the medium facing surface at a position on a leading side of the end face of the main pole along a direction of travel of the recording medium;

the first and second side shields have two end faces that are located in the medium facing surface at positions on opposite sides of the end face of the main pole in a track width direction;

the top shield has an end face that is located in the medium facing surface at a position on a trailing side of the end face of the main pole along the direction of travel of the recording medium;

the first return path section includes a yoke layer, and a coupling layer that magnetically couples the bottom shield and the yoke layer to each other;

in a cross section that intersects the end face of the main pole located in the medium facing surface and that is perpendicular to the medium facing surface and the top surface of the substrate, the yoke layer is greater than the bottom shield in length in a direction perpendicular to the medium facing surface, and the coupling layer is greater than the bottom shield and smaller than the yoke layer in length in the direction perpendicular to the medium facing surface;

the second return path section magnetically couples the top shield and the main pole to each other;

the coil includes a first portion that passes through a space defined by the main pole and the first return path section, and a second portion that passes through a space defined by the main pole and the second return path section;

the main pole has a bottom end which is an end closer to the top surface of the substrate, and has a top surface opposite to the bottom end;

the bottom end of the main pole includes a first portion and a second portion that are contiguously arranged in order of increasing distance from the medium facing surface;

a distance from the top surface of the substrate to any given point on each of the first and second portions of the bottom end of the main pole decreases with increasing distance from the given point to the medium facing surface;

the bottom shield has a top surface that is opposed to the first portion of the bottom end of the main pole with the gap part interposed therebetween;

a distance from the top surface of the substrate to any given point on the top surface of the bottom shield decreases with increasing distance from the given point to the medium facing, surface; and in the cross section, the second portion of the bottom end of the main pole is located farther from the medium facing surface than is the top surface of the bottom shield.

2. The magnetic head for perpendicular magnetic recording according to claim 1, wherein the first return path section magnetically couples the bottom shield and the main pole to each other.

3. The magnetic head for perpendicular magnetic recording according to claim 1, wherein the coupling layer has an end face that is located in the medium facing surface at a position on the leading side of the end face of the bottom shield along the direction of travel of the recording medium.

4. The magnetic head for perpendicular magnetic recording according to claim 1, wherein:

the main pole has a first side part and a second side part that are opposite to each other in the track width direction;

the first side shield has a first sidewall that is opposed to the first side part of the main pole;

the second side shield has a second sidewall that is opposed to the second side part of the main pole; and in the medium facing surface, a distance between the first and second side parts in the track width direction and a distance between the first and second sidewalls in the track width direction both decrease with increasing proximity to the top surface of the substrate.

5. The magnetic head for perpendicular magnetic recording according to claim 4, wherein, in the medium facing surface, G1 falls within the range of 20 to 80 nm while G2 is greater than G1 and equal to or smaller than three times G1, where G1 represents both a distance between the first side part and the first sidewall and a distance between the second side part and the second sidewall, while G2 represents a distance between a bottom end of the main pole and the bottom shield.

6. The magnetic head for perpendicular magnetic recording according to claim 1, wherein:

the top surface of the main pole includes an inclined surface that has an end located in the medium facing surface; and a distance from the top surface of the substrate to any given point on the inclined surface increases with increasing distance from the given point to the medium facing surface.

7. The magnetic head for perpendicular magnetic recording according to claim 6, wherein:

the top shield has a bottom surface that is opposed to the inclined surface with the gap part interposed therebetween; and a distance from the top surface of the substrate to any given point on the bottom surface of the top shield increases with increasing distance from the given point to the medium facing surface.

* * * * *